US011526006B2

(12) United States Patent
Inoue et al.

(10) Patent No.: US 11,526,006 B2
(45) Date of Patent: Dec. 13, 2022

(54) HALF-MIRROR FILM FOR DISPLAYING PROJECTION IMAGE, LAMINATED GLASS FOR DISPLAYING PROJECTION IMAGE, AND IMAGE DISPLAY SYSTEM

(71) Applicant: FUJIFILM Corporation, Tokyo (JP)

(72) Inventors: Rikio Inoue, Minami-ashigara (JP); Shusuke Arita, Minami-ashigara (JP); Wataru Majima, Minami-ashigara (JP); Takao Taguchi, Minami-ashigara (JP); Yujiro Yanai, Minami-ashigara (JP); Taketo Otani, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 162 days.

(21) Appl. No.: 16/811,447

(22) Filed: Mar. 6, 2020

(65) Prior Publication Data

US 2020/0209619 A1    Jul. 2, 2020

Related U.S. Application Data

(63) Continuation of application No. PCT/JP2018/033307, filed on Sep. 7, 2018.

(30) Foreign Application Priority Data

Sep. 7, 2017   (JP) ............................. JP2017-172496
Oct. 4, 2017   (JP) ............................. JP2017-194576
(Continued)

(51) Int. Cl.
*G02B 27/01*    (2006.01)
*G02B 27/14*    (2006.01)

(52) U.S. Cl.
CPC ....... *G02B 27/0101* (2013.01); *G02B 27/145* (2013.01); *G02B 2027/0196* (2013.01)

(58) Field of Classification Search
CPC .. G02B 27/01; G02B 27/0101; G02B 27/145; G02B 2027/0196
See application file for complete search history.

(56) References Cited

U.S. PATENT DOCUMENTS 4,230,767 A *  10/1980  Isaka ...................... C09J 123/20
                                                           428/513
2003/0108734 A1    6/2003  Yano et al.
(Continued)

FOREIGN PATENT DOCUMENTS

CN    106716229 A    5/2017
JP    11-249061 A    9/1999
(Continued)

OTHER PUBLICATIONS

Chinese Office Action and Search Report for Chinese Application No. 201880057540.X, dated May 13, 2021, with English translation of the Office Action.
(Continued)

*Primary Examiner* — Alexander Eisen
*Assistant Examiner* — Cory A Almeida
(74) *Attorney, Agent, or Firm* — Birch, Stewart, Kolasch & Birch, LLP

(57) ABSTRACT

An object of the present invention is to provide a half-mirror film for displaying a projection image having high adhesiveness, a laminated glass in which wrinkle generation of the half-mirror film is suppressed or furthermore has high adhesiveness, and an image display system using the laminated glass. The problem is solved by providing a half-mirror film for displaying a projection image including a transparent support; and a selective reflection layer reflecting light in a wavelength selective manner, in which the transparent support has an absolute value of 10 nm or less of an in-plane phase difference at a wavelength of 550 nm and a heat seal layer disposed on an opposite surface of a surface
(Continued)

having the selective reflection layer, the heat seal layer contains a thermoplastic resin, and a mixed layer in which components of the transparent support and the heat seal layer are mixed is formed between the transparent support and the heat seal layer.

20 Claims, 3 Drawing Sheets

(30) Foreign Application Priority Data

Dec. 20, 2017 (JP) .............................. JP2017-244383
May 16, 2018 (JP) .............................. JP2018-094912

(56) References Cited

U.S. PATENT DOCUMENTS

| 2007/0172642 | A1 | 7/2007 | Fukatani et al. |
| 2012/0327318 | A1* | 12/2012 | Tamura ............. B32B 17/10458 349/16 |
| 2014/0192286 | A1 | 7/2014 | Tasaka et al. |
| 2015/0192718 | A1 | 7/2015 | Saito et al. |
| 2017/0192231 | A1* | 7/2017 | Ichihashi .......... B32B 17/10458 |
| 2017/0235030 | A1 | 8/2017 | Tanaka et al. |
| 2017/0326843 | A1 | 11/2017 | Noda |
| 2017/0343806 | A1 | 11/2017 | Anzai et al. |

FOREIGN PATENT DOCUMENTS

| JP | 2003-201409 A | 7/2003 |
| JP | 2012-254924 A | 12/2012 |
| JP | 2013-76052 A | 4/2013 |
| JP | 2016-12117 A | 1/2016 |
| JP | 2016-64974 A | 4/2016 |
| JP | 2016-117191 A | 6/2016 |
| JP | 2016-153281 A | 8/2016 |
| JP | 2016-216039 A | 12/2016 |
| JP | 2017-19669 A | 1/2017 |
| JP | 2017019669 A * | 1/2017 |
| WO | WO 2016/052367 A1 | 4/2016 |
| WO | WO 2016/152458 A1 | 9/2016 |
| WO | WO 2016/208548 A1 | 12/2016 |

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2018/033307, dated Mar. 19, 2020.
International Search Report (Form PCT/ISA/210) for International Application No. PCT/JP2018/033307, dated Nov. 27, 2018, with English translation.
Partial European Search Report for European Application No. 18853693.2, dated Sep. 28, 2020.
Extended European Search Report for European Application No. 18853693.2, dated Mar. 2, 2021.
Japanese Office Action for Japanese Application No. 2019-541038, dated Mar. 2, 2021, with English translation.
Japanese Notice of Reasons for Refusal for Japanese Application No. 2019-541038, dated Nov. 30, 2021, with an English translation.
Japanese Notice of Reasons for Refusal for Japanese Application No. 2019-541038, dated Jun. 28, 2022, with an English translation.

* cited by examiner

HALF-MIRROR FILM FOR DISPLAYING PROJECTION IMAGE, LAMINATED GLASS FOR DISPLAYING PROJECTION IMAGE, AND IMAGE DISPLAY SYSTEM

CROSS-REFERENCE TO RELATED APPLICATIONS

This application is a Continuation of PCT International Application No. PCT/JP2018/033307 filed on Sep. 7, 2018, which claims priority under 35 U.S.C. § 119(a) to Japanese Patent Application No. 2017-172496 filed on Sep. 7, 2017, Japanese Patent Application No. 2017-194576 filed on Oct. 4, 2017, Japanese Patent Application No. 2017-244383 filed on Dec. 20, 2017 and Japanese Patent Application No. 2018-094912 filed on May 16, 2018. Each of the above applications is hereby expressly incorporated by reference, in its entirety, into the present application.

BACKGROUND OF THE INVENTION

1. Field of the Invention

The invention relates to a half-mirror film for displaying a projection image, a laminated glass for displaying a projection image, and an image display system using the laminated glass for displaying a projection image.

2. Description of the Related Art

A laminated glass used for an automobile windshield or the like includes a half-mirror film so that the laminated glass can also be used as a projection image display member of a head-up display system. It is disclosed in WO2016/052367A that a half-mirror film including a phase difference layer and a plurality of cholesteric liquid crystal layers is used as a projection image display member. It is described in WO2016/052367A that a half-mirror film is provided in an intermediate film in a windshield glass having a laminated glass structure.

In general, a laminated glass has an intermediate film between two glass plates.

SUMMARY OF THE INVENTION

When the present inventors examined, in a case of preparing a laminated glass having a wide area such as an automobile windshield, there is a problem that a half-mirror film is likely to have wrinkles when an intermediate film and the half-mirror film are bonded at the same time. In particular, in a case where a glass plate having a curved surface is used, the wrinkles were remarkably generated.

In a case where wrinkles are generated even at one portion, the entire laminated glass including the wrinkled portion is treated as a defective product. Therefore, the wrinkle generation is a problem directly related to yield. In addition, there is also a problem that fine wrinkles cause an optical distortion and adversely affect visibility of a projected image.

Furthermore, there is a problem that the half-mirror film which is formed by laminating a plurality of layers has low adhesiveness.

An object of the invention is to provide a half-mirror film for displaying a projection image having lamination and high adhesiveness, a laminated glass for displaying a projection image using the half-mirror film, a laminated glass for displaying a projection image having high adhesiveness, a laminated glass for displaying a projection image in which wrinkle generation of a half-mirror film is suppressed, and an image display system using the laminated glass.

The present inventors conducted intensive studies, and as a result, it was found that the half-mirror film is provided with a heat seal layer on a transparent support so as to improve adhesiveness of the half-mirror film and the laminated glass using the half-mirror film is provided with a specific heat seal layer so as to suppress the wrinkle generation of the half-mirror film, or furthermore, so as to obtain a laminated glass having high adhesiveness.

[1] A half-mirror film for displaying a projection image comprising: a transparent support; and a selective reflection layer reflecting light in a wavelength selective manner, wherein the transparent support has an absolute value of 10 nm or less of an in-plane phase difference at a wavelength of 550 nm and a heat seal layer disposed on an opposite surface of a surface having the selective reflection layer, the heat seal layer contains a thermoplastic resin, and a mixed layer in which a component of the transparent support and a component of the heat seal layer are mixed is formed between the transparent support and the heat seal layer.

[2] The half-mirror film for displaying a projection image according to [1], further comprising: a phase difference layer between the transparent support and the selective reflection layer, wherein an in-plane phase difference of the phase difference layer at a wavelength of 550 nm is 250 to 450 nm or 50 to 180 nm.

[3] The half-mirror film for displaying a projection image according to [1] or [2], wherein a surface of the heat seal layer is roughened.

[4] The half-mirror film for displaying a projection image according to any one of [1] to [3], wherein at least one of the transparent support or the heat seal layer contains a component derived from a compound having a plurality of groups selected from the group consisting of a polymerizable group and a group capable of forming a bond with a resin contained in the transparent support.

[5] A laminated glass for displaying a projection image comprising: the half-mirror film for displaying a projection image according to any one of [1] to [4]; and an intermediate film adjacent to the selective reflection layer of the half-mirror film for displaying a projection image, wherein the half-mirror film for displaying a projection image and the intermediate film are sandwiched by two glass plates.

[6] A laminated glass for displaying a projection image comprising: a half-mirror film; an intermediate film; and a heat seal layer, wherein the half-mirror film and the intermediate film are sandwiched by a glass plate on the half-mirror film side and a glass plate on the intermediate film side, and the heat seal layer has a thermoplastic resin, is formed between the half-mirror film and the glass plate of the half-mirror film side, and has a thickness of 0.1 to 50 μm.

[7] The laminated glass for displaying a projection image according to [6], wherein the half-mirror film has a selective reflection layer that reflects light in a wavelength selective manner and a phase difference layer, and the heat seal layer is adjacent to the selective reflection layer or the phase difference layer.

[8] The laminated glass for displaying a projection image according to [7], wherein the heat seal layer is adjacent to the selective reflection layer.

[9] The laminated glass for displaying a projection image according to any one of [6] to [8], wherein the heat seal layer contains an inorganic fine particle which forms a secondary particle formed by aggregation of a primary particle in which an average primary particle diameter is 5 to 50 nm.

[10] An image display system comprising: the laminated glass for displaying a projection image according to any one of [5] to [9], wherein an image is projected from a p linearly polarized light source to the laminated glass for displaying a projection image.

According to the invention, there can be provided a half-mirror film for displaying a projection image having high adhesiveness, a laminated glass for displaying a projection image in which wrinkle generation of the half-mirror film is suppressed or furthermore has high adhesiveness, and an image display system using the laminated glass.

DESCRIPTION OF THE PREFERRED EMBODIMENTS

Figure 1:
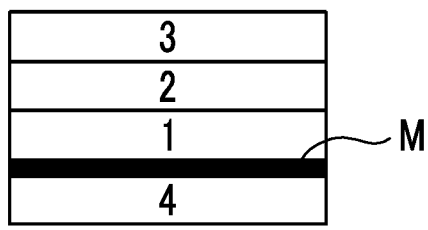
FIG. 1 is a diagram conceptually showing an example of a half-mirror film for displaying a projection image of the invention.

Hereinafter, the invention will be described in detail.

In the specification, "to" is used as a meaning including numerical values disclosed before and after "to" as a lower limit value and an upper limit value.

In addition, in the specification, angles (for example, angles of "90°" and the like) and relationships thereof (for example, "parallel", "horizontal", and "perpendicular" states) include a range of errors allowed in the technical field of the invention. For example, this means that the error is in a range of less than ±10° from an exact angle and the error from the exact angle is preferably 5° or less and more preferably 3° or less.

In the specification, in a case where an expression "selective" is used regarding circularly polarized light, light amount of any one of a right-handed circularly polarized light component or a left-handed circularly polarized light component of an incident ray is greater than the light amount of the other circularly polarized light components. Specifically, in a case where an expression "selective" is used, a degree of circular polarization of light is preferably 0.3 or more, more preferably 0.6 or more, and still more preferably 0.8 or more. Substantially, the degree of circular polarization of light is still more preferably 1.0. Here, in a case where the intensity of a right-handed circularly polarized light component of light is set as $I_R$ and the intensity of a left-handed circularly polarized light component of light is set as $I_L$, the degree of circular polarization is a value represented by $|I_R-I_L|/(I_R+I_L)$.

In the specification, a term "sense" regarding circularly polarized light means right-handed circularly polarized light or left-handed circularly polarized light. In a case of observing light so that light is emitted frontward, the sense of the circularly polarized light is right-handed circularly polarized light in a case where an end point of an electric field vector rotates clockwise in accordance with the lapse of time, and the sense of the circularly polarized light is left-handed circularly polarized light in a case where an end point of an electric field vector rotates anticlockwise.

In the specification, a term "sense" may be used in regards to a twisted direction of a helix of a cholesteric liquid crystal. In a case where a twisted direction (sense) of a helix of a cholesteric liquid crystal is right, the cholesteric liquid crystal reflects right-handed circularly polarized light and transmits left-handed circularly polarized light, and in a case where the sense is left, the cholesteric liquid crystal reflects left-handed circularly polarized light and transmits right-handed circularly polarized light.

In the specification, a term "light" means light of visible light and natural light (non-polarized light), unless otherwise noted. A visible light is light at a wavelength which is visible to the human eye, among electromagnetic waves, and is normally light in a wavelength region of 380 to 780 nm.

In the specification, in a case where term "reflected light" or "transmitted light" is simply used, the terms are used as meanings to include scattered light and diffracted light.

A polarized state of light at each wavelength can be measured with a spectral radiance meter or a spectrometer on which a circularly polarizing plate is mounted. In this case, the intensity of light measured through a right-handed circularly polarizing plate corresponds to $I_R$, and the intensity of light measured through a left-handed circularly polarizing plate corresponds to $I_L$. In addition, the polarized state can also be measured by attaching the circularly polarizing plate to an illuminance meter or an optical spectrometer. The right-handed circularly polarized light amount is measured by attaching a right-handed circularly polarized light transmission plate thereto, the left-handed circularly polarized light amount is measured by attaching a left-handed circularly polarized light transmission plate thereto, and thus, a ratio therebetween can be measured.

In the specification, p-polarized light means polarized light which vibrates in a direction parallel to a plane of incidence of light. The plane of incidence means a surface which is perpendicular to a reflecting surface (windshield glass surface or the like) and contains the incident rays and reflected rays. A vibrating surface of an electric field vector of the p-polarized light is parallel to the plane of incidence.

In the specification, the in-plane phase difference (in-plane phase difference Re) is a value measured with AxoScan manufactured by Axometrics, Inc. The measurement wavelength is 550 nm unless otherwise specified.

In the specification, "projection image" means an image based on a projection of light from a projector to be used, which is not a scenery viewed from the driver's position such as the driver's field. The projection image is observed as a virtual image which is observed by an observer as the projection image is floated over the projection image display portion of the windshield glass.

In the specification, "screen image" means an image displayed on a drawing device of a projector or an image drawn on an intermediate image screen or the like by a drawing device. Unlike a virtual image, the screen image is a real image.

Both the screen image and the projection image may be monochrome images, multicolor images of two or more colors, or full color images.

In the specification, "visible light transmittance" is a visible light transmittance of an A light source defined in JIS R 3212: 2015 (Vehicle Safety Glass Test Method). That is, the transmittance is obtained by measuring a transmittance of each wavelength in a range of 380 to 780 nm with a spectrophotometer using the A light source, multiplying a wavelength distribution of International Commission on Illumination (CIE) photopic spectral luminous efficiency function and pre-calculated weighting functions obtained from an interval wavelength by the transmittance at each wavelength, and performing a weighted average.

In the specification, a liquid crystal composition and a liquid crystal compound also conceptually include a composition and a compound which no longer exhibit liquid crystal properties in advance due to curing or the like.

Hereinafter, a half-mirror film for displaying a projection image, a laminated glass for displaying a projection image, and an image display system of an embodiment of the invention will be described with reference to the accompanying drawings. FIGS. 1 to 7 shown below, the same members are denoted by the same reference numerals.

FIG. 1 conceptually shows an example of the half-mirror film for displaying a projection image of the embodiment of the invention.

As shown in FIG. 1, the half-mirror film for displaying a projection image of the embodiment of the invention includes a heat seal layer 4, a transparent support 1, a phase difference layer 2, and a selective reflection layer 3 in order from the lower side in the figure.

In the half-mirror film for displaying a projection image of the embodiment of the invention, the heat seal layer 4 is provided on a surface opposite to the selective reflection layer 3 of the transparent support 1. Furthermore, a mixed layer M in which a component of the transparent support 1 and a component of the heat seal layer 4 are mixed is formed between the transparent support 1 and the heat seal layer 4. As shown in Example later, a first aspect of the half-mirror film for displaying a projection image of the embodiment of the invention and the laminated glass of the embodiment of the invention described later realizes high adhesiveness in the transparent support 1 and the heat seal layer 4 by including the mixed layer.

In the half-mirror film for displaying a projection image of the embodiment of the invention, a phase difference layer 2 is provided as a preferred aspect and provided between the transparent support 1 and the selective reflection layer 3.

Figure 2:
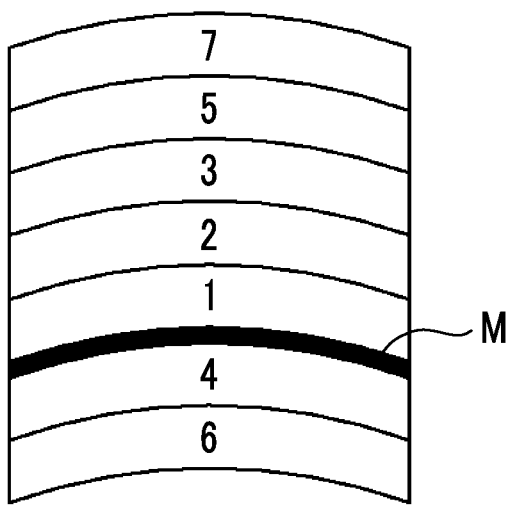
FIG. 2 is a diagram conceptually showing an example of a first aspect of a laminated glass for displaying a projection image of the invention.

FIG. 2 is a diagram conceptually showing an example of a first aspect of the laminated glass for displaying a projection image of the embodiment of the invention. In the following description, the "laminated glass for displaying a projection image" is also simply referred to as a "laminated glass".

In the first aspect of the laminated glass of the invention, the laminated glass is formed such that the half-mirror film for displaying a projection image of the embodiment of the invention described above and an intermediate film adjacent to the selective reflection layer of the half-mirror film for displaying a projection image are sandwiched by two glass plates.

The laminated glass shown in FIG. 2 includes a first glass 6, the heat seal layer 4, the transparent support 1, the phase difference layer 2, the selective reflection layer 3, an intermediate film 5, and a second glass 7 in order from the lower side in the figure. As described above, the half-mirror film for displaying a projection image of the embodiment of the invention is configured to include the heat seal layer 4, the transparent support 1, the phase difference layer 2, and the selective reflection layer 3, and the mixed layer M is formed between the heat seal layer 4 and the transparent support. 1.

By having such a configuration, the first aspect of the laminated glass of the invention realizes a laminated glass which has high adhesiveness of the half-mirror film for displaying a projection image and also in which wrinkle generation of the half-mirror film for displaying a projection image is suppressed.

Figure 3:
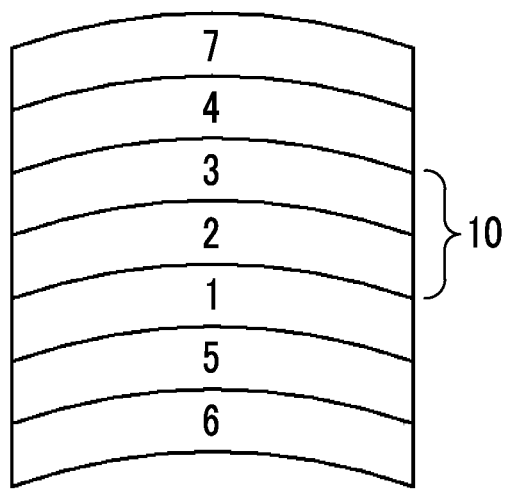
FIG. 3 is a diagram conceptually showing an example of a second aspect of the laminated glass for displaying a projection image of the invention.

FIG. 3 is a diagram conceptually showing an example of a second aspect of the laminated glass of the invention.

In the second aspect of the laminated glass of the invention, the half-mirror film and the intermediate film are sandwiched by a glass plate on the half-mirror film side and a glass plate on the intermediate film side, and the laminated glass includes the heat seal layer having a thermoplastic resin formed between the half-mirror film and the glass plate on the half-mirror film side and having a thickness of 0.1 to 50 µm. The second aspect of the laminated glass of the invention includes the heat seal layer, so that wrinkle generation of the half-mirror film is suppressed in the laminated glass for displaying a projection image using the half-mirror film.

The laminated glass shown in FIG. 3 includes the first glass 6, the intermediate film 5, the transparent support 1, the phase difference layer 2, the selective reflection layer 3, the heat seal layer 4, and the second glass 7 in order from the lower side in the figure. In the present example, as a preferred embodiment, the transparent support 1, the phase difference layer 2, and the selective reflection layer 3 constitute a half-mirror film 10.

Figure 4:
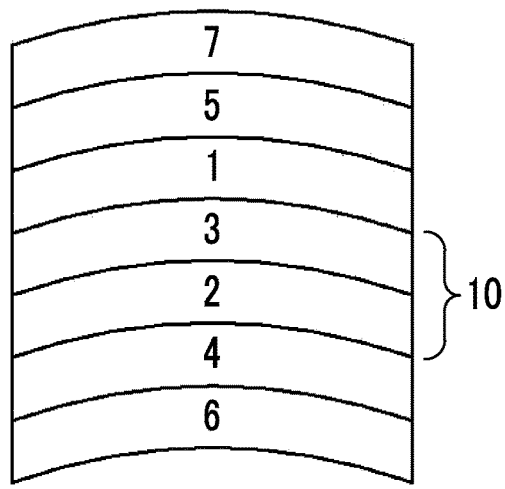
FIG. 4 is a diagram conceptually showing another example of the second aspect of the laminated glass for displaying a projection image of the invention.

Another example of the second aspect of the laminated glass of the invention is shown in FIG. 4. The laminated glass shown in FIG. 4 has the first glass 6, the heat seal layer 4, the phase difference layer 2, the selective reflection layer 3, the transparent support 1, the intermediate film 5, and the second glass 7 in order from the lower side in the figure. In the present example, as a preferred embodiment, the phase difference layer 2, the selective reflection layer 3, and the transparent support 1 constitute the half-mirror film 10.

As a preferred embodiment, in the laminated glass shown in FIGS. 3 and 4, the heat seal layer 4 is adjacent to the phase difference layer 2 or the selective reflection layer 3, and as more preferred embodiment, in the laminated glass shown in FIG. 3, the heat seal layer 4 is adjacent to the selective reflection layer 3.

Figure 5:
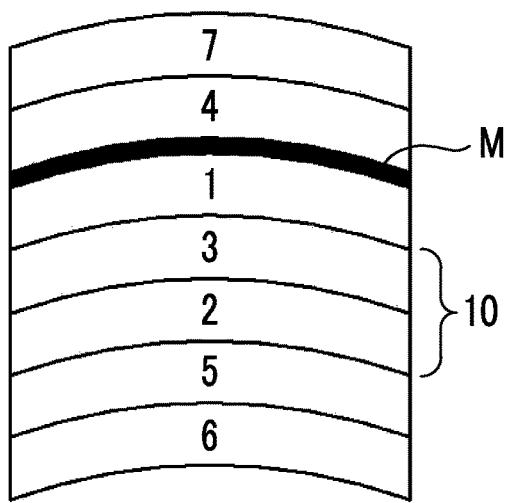
FIG. 5 is a diagram conceptually showing the other example of the second aspect of the laminated glass for displaying a projection image of the invention.

Another example of the second aspect of the laminated glass of the invention is shown in FIG. 5. The laminated glass shown in FIG. 5 includes the first glass 6, the intermediate film 5, the phase difference layer 2, the selective reflection layer 3, the transparent support 1, the heat seal layer 4, and the second glass 7 in order from the lower side in the figure. In the present example, as a preferred embodiment, the phase difference layer 2, the selective reflection layer 3, and the transparent support 1 constitute the half-mirror film 10. In addition, the mixed layer M is formed between the heat seal layer 4 and the transparent support 1.

In the second aspect of the laminated glass of the invention, in a case where the transparent support 1 and the heat seal layer 4 are adjacent to each other, as shown in FIG. 5, the mixed layer M in which the component of the transparent support 1 and the component of the heat seal layer 4 are mixed may be formed between the transparent support 1 and the heat seal layer 4.

However, the second aspect of the laminated glass of the invention is not limited thereto, and even in a case where the transparent support 1 and the heat seal layer 4 are adjacent to each other, the mixed layer M may not be formed therebetween. In addition, in a case where the transparent support 1 and the heat seal layer 4 are adjacent to each other and the mixed layer M is not formed therebetween, an adhesiveness enhancer described later may be used for the heat seal layer 4.

In the laminated glass of the embodiment of the invention, the heat seal layer 4 is preferably in contact with either the first glass 6 or the second glass 7 in both of the first aspect and the second aspect.

The second aspect of the laminated glass of the invention shown in each of FIGS. 3 to 5 has the transparent support 1. However, the laminated glass of the second aspect of the invention is not limited thereto. That is, the second aspect of the laminated glass of the invention may not have the transparent support 1.

Figure 6:
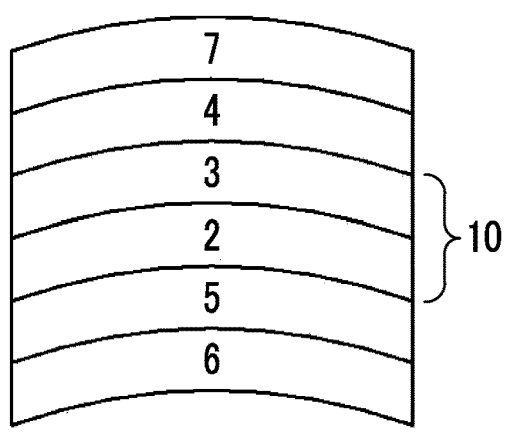
FIG. 6 is a diagram conceptually showing the other example of the second aspect of the laminated glass for displaying a projection image of the invention.

For example, in a case of the laminated glass shown in FIG. 3, as conceptually shown in FIG. 6, there may be a configuration in which the first glass 6, the intermediate film 5, the phase difference layer 2, the selective reflection layer 3, the heat seal layer 4, and the second glass 7 is formed in order from the lower side in the figure without the transparent support 1.

In addition, in a case of the laminated glass shown in FIG. 5, there may be a configuration in which the first glass 6, the intermediate film 5, the phase difference layer 2, the selective reflection layer 3, the heat seal layer 4, and the second glass 7 is formed in order from the lower side in the figure without the transparent support 1.

That is, in the second aspect of the laminated glass of the invention, various different layer constitutions can be used as long as the half-mirror film 10 and the intermediate film 5 are sandwiched by a first glass 6 and a second glass 7 and the laminated glass includes the heat seal layer 4 formed between the half-mirror film 10 and any of the glass plates and having a thickness of 0.1 to 50 µm.

Hereinafter, the half-mirror film for displaying a projection image and the laminated glass of the embodiment of the invention having such a layer constitution, and each layer constituting the half-mirror film for displaying a projection image and the laminated glass of the embodiment of the invention will be described in detail.

<<Half-Mirror Film for Displaying Projection Image>>

In the specification, the half-mirror film for displaying a projection image means a half-mirror film capable of displaying a projection image using reflected light.

The half-mirror film for displaying a projection image of the embodiment of the invention has a visible light transmittance. Specifically, a visible light transmittance of the half-mirror film for displaying a projection image of the embodiment of the invention is preferably 85% or more, more preferably 86% or more, and even more preferably 87% or more.

Due to such a high visible light transmittance, even though the laminated glass is formed by combining with a glass having a low visible light transmittance, a visible light transmittance satisfying the standard of a vehicle windshield glass can be realized.

It is preferable that the half-mirror film for displaying a projection image of the embodiment of the invention does not exhibit substantial reflection in a wavelength region having a high luminosity factor. Specifically, when comparing a normal laminated glass and the laminated glass in which the half-mirror film for displaying a projection image of the embodiment of the invention is incorporated with respect to light from the normal direction, it is preferable to show substantially equivalent reflection near a wavelength of 550 nm. In particular, it is more preferable to show substantially equivalent reflection in the visible light wavelength region of 490 to 620 nm. "Substantially equivalent reflection" means that, for example, a difference in reflectance of natural light (non-polarized light) at a target wavelength measured from the normal direction with a spectrophotometer such as a spectrophotometer "V-670" manufactured by JASCO Corporation is 10% or less. In the above-described wavelength region, the difference in reflectance is preferably 5% or less, more preferably 3% or less, even more preferably 2% or less, and particularly preferably 1% or less. Due to the substantially equivalent reflection in a wavelength region having high luminosity factor, even though the laminated glass is formed by combining with a glass having a low visible light transmittance, a visible light transmittance satisfying the standard of a vehicle windshield glass can be realized.

The half-mirror film for displaying a projection image of the embodiment of the invention may have a thin film-shaped, a sheet-shaped, and the like.

The half-mirror film for displaying a projection image of the embodiment of the invention may become a roll-shaped as the thin film-shaped before used for a windshield glass.

The half-mirror film for displaying a projection image of the embodiment of the invention may have a function as a half mirror, at least, for a part of projected light, and for example, does not need to have a function as a half mirror for light in the entire visible light region. In addition, the half-mirror film for displaying a projection image of the embodiment of the invention may have a function as the half-mirror for light at all incidence angles, and may have a function as the half-mirror, at least, for light at some incidence angles.

As described above, the half-mirror film for displaying a projection image of the embodiment of the invention includes the transparent support, the selective reflection layer, and the heat seal layer.

In the first aspect of the laminated glass (for displaying a projection image) of the invention, the laminated glass is formed such that the half-mirror film for displaying a projection image of the embodiment of the invention and the intermediate film are sandwiched by two glass plates, and the intermediate film is adjacent to the selective reflection layer.

In addition, the second aspect of the laminated glass (for displaying a projection image) of the invention, the laminated glass is formed such that the half-mirror film and the intermediate film are sandwiched by two glass plates, and the heat seal layer is formed between the half-mirror film and the glass plate.

Furthermore, the half-mirror film for displaying a projection image and the laminated glass of the embodiment of the invention may include layers such as a phase difference layer, an orientation layer, and an adhesive layer as necessary.

<Selective Reflection Layer>

The selective reflection layer is a layer that reflects light in a wavelength selective manner. The selective reflection layer preferably exhibits selective reflection in a part of the visible light wavelength region. The selective reflection layer may reflect light for displaying a projection image.

In the invention, a selective reflection center wavelength in the selective reflection layer which has a selective reflection center wavelength at the shortest wavelength is preferably 650 to 780 nm. In the specification, a selective reflection center wavelength λ of the selective reflection layer means a wavelength at a central position of a reflection peak in a reflection spectrum measured from a normal direction of the selective reflection layer. Such a constitution is realized by including, for example, a half-mirror for displaying a projection image which includes a selective reflection layer having the center wavelength of selective reflection of 650 to 780 nm and does not include a selective reflection layer having the selective reflection center wavelength in the visible light wavelength region of less than 650 nm.

In the invention, a selective reflection center wavelength in the selective reflection layer which has the selective reflection center wavelength at the shortest wavelength is preferably 750 nm or less, more preferably 720 nm or less, and even more preferably 700 nm or less.

The half-mirror film for displaying a projection image and the laminated glass of the embodiment of the invention may include two or more selective reflection layers.

The selective reflection center wavelengths of two or more selective reflection layers may be the same or different, but are preferably different from each other. Two or more selective reflection layers have different selective reflection center wavelengths from each other, so that a double image can be reduced. For example, in a case where the two selective reflection layers are included, the selective reflection center wavelength of the two layers is preferably different by 60 nm or more, more preferably different by 80 nm or more, and even more preferably different by 100 nm or more. The selective reflection center wavelengths of the selective reflection layer having the two or more layers may be 650 to 780 nm, at least one may be 650 to 780 nm, the other may be at a wavelength greater than 780 nm, but both selective reflection center wavelengths of the two or more layers are preferably 650 to 780 nm.

The selective reflection layer is preferably a polarized light reflection layer. The polarized light reflection layer is a layer that reflects linearly polarized light, circularly polarized light, or elliptically polarized light.

The polarized light reflection layer is preferably a circularly polarized light reflection layer or a linearly polarized light reflection layer. The circularly polarized light reflection layer is a layer that reflects the circularly polarized light of one sense and transmits the circularly polarized light of the other sense in a wavelength region where selective reflection occurs. Further, the linearly polarized light reflection layer is a layer that reflects linearly polarized light in one polarization direction and transmits linearly polarized light in a polarization direction orthogonal to the polarization direction in which light is reflected in the wavelength region where selective reflection occurs.

The polarized light reflection layer can transmit polarized light which is not reflected, and can transmit a part of light even in a wavelength region where the selective reflection layer exhibits reflection. Therefore, it is preferable since a color of light transmitted through the half-mirror for displaying a projection image is hardly deteriorated and the visible light transmittance is also hardly lowered.

A cholesteric liquid crystal layer is preferable as the selective reflection layer which is a circularly polarized light reflection layer.

[Cholesteric Liquid Crystal Layer]

In the specification, the cholesteric liquid crystal layer means a layer obtained by immobilizing a cholesteric liquid crystalline phase.

The cholesteric liquid crystal layer may be a layer in which orientation of a liquid crystal compound as the cholesteric liquid crystalline phase is maintained, and typically, may be a layer obtained by setting a state of polymerizable liquid crystal compound in an orientation state of cholesteric liquid crystalline phase, polymerizing and curing the polymerizable liquid crystal compound by ultraviolet light irradiation or heating to form a layer having no fluidity, and, at the same time, changing the state thereof to a state where a change does not occur in the orientation state due to an external field, an external force, or the like.

In the cholesteric liquid crystal layer, optical properties of the cholesteric liquid crystalline phase may be maintained in the layer, and the liquid crystal compound in the layer may not exhibit liquid crystal properties in advance. For example, the polymerizable liquid crystal compound may have high molecular weight due to a curing reaction and lose liquid crystal properties in advance.

It is known that the cholesteric liquid crystal layer exhibits circularly polarized light selective reflection of selectively reflecting circularly polarized light of any one sense of right-handed circularly polarized light or left-handed circularly polarized light, and transmitting circularly polarized light of the other sense.

A large number of films formed of a composition including a polymerizable liquid crystal compound are known in the related art, as a film including a layer obtained by immobilizing a cholesteric liquid crystalline phase exhibiting circularly polarized light selective reflection properties, and thus, regarding the cholesteric liquid crystal layer, the technologies of the related art can be referred to.

A selective reflection center wavelength λ of the cholesteric liquid crystal layer depends on a pitch P (=period of helix) of a helix structure of the cholesteric phase and satisfies a relationship of $\lambda = n \times P$, with an average refractive index n of the cholesteric liquid crystal layer. It can be seen from the expression, the selective reflection center wavelength can be adjusted to 650 to 780 nm by adjusting n value and P value.

The selective reflection center wavelength and a half-width of the cholesteric liquid crystal layer can be obtained as follows.

In a case where the transmission spectrum (measured from the normal direction in the cholesteric liquid crystal layer) of the cholesteric liquid crystal layer is measured using a spectrophotometer UV3150 (Shimadzu Corporation), a reduction of peak transmittance is observed in the selective reflection band. Among the two wavelengths that are intermediate (average) transmittance between a minimum transmittance of the peak and a transmittance before the peak transmittance is reduced, assuming that a wavelength value of a shorter wavelength side is $\lambda_l$ (nm) and a wavelength value of a longer wavelength side is $\lambda_h$ (nm), the selective reflection center wavelength λ and the half-width Δλ of the selective reflection can be expressed by the following expression.

$$\lambda = (\lambda_l + \lambda_h)/2 \Delta\lambda = (\lambda_h - \lambda_l)$$

The selective reflection center wavelength which is obtained as described above substantially coincides with a wavelength at the center of gravity of reflection peak of circularly polarized light reflection spectra measured in a normal direction of the cholesteric liquid crystal layer.

As described later, a head-up display system is used such that light is obliquely incident onto the windshield glass, and as a result, reflectance on a glass plate surface of a projected light incidence side can be reduced. In this case, light is also obliquely incident onto the cholesteric liquid crystal layer. For example, light incident at an angle of 45° to 70° with respect to the normal line of the projection image display portion in air having the refractive index of 1 passes through the cholesteric liquid crystal layer having the refractive index of 1.61 at an angle of 26° to 36°. In this case, a reflection wavelength is shifted to the shorter wavelength side. Assuming that the selective reflection center wavelength is $\lambda_d$ when a ray of light passes at an angle of $\theta_2$ with respect to the normal direction of the cholesteric liquid crystal layer (a helix axis direction of the cholesteric liquid crystal layer) in the cholesteric liquid crystal layer in which the selective reflection center wavelength is $\lambda$, $\lambda_d$ is represented by the following expression.

$$\lambda_d = \lambda \times \cos \theta_2$$

Therefore, the cholesteric liquid crystal layer having a selective reflection center wavelength in the range of 650 to 780 nm when $\theta_2$ is 26° to 36° can reflect projected light in the range of 520 to 695 nm.

Since such a wavelength range is a wavelength region having high luminosity factor, contribution to brightness of the projection image is high, and as a result, a projection image having high brightness can be realized.

The pitch of the cholesteric liquid crystalline phase depends on the type of chiral agents used together with the polymerizable liquid crystal compound and the addition concentration thereof, and thus, a desired pitch can be obtained by adjusting these. As a measurement method of the sense and the pitch of the helix, methods disclosed in "Liquid Crystal Chemistry Experiment Introduction" edited by The Japanese Liquid Crystal Society, published by Sigma Publication 2007, pp. 46, and "Handbook of liquid crystals Editorial Committee of Handbook of liquid crystals, Maruzen, pp. 196 may be used.

In the half-mirror film for displaying a projection image and the laminated glass of the embodiment of the invention, the cholesteric liquid crystal layer is preferably formed in order from the shortest selective reflection center wavelength as viewed from a visible side (inside a vehicle).

As each cholesteric liquid crystal layer, a cholesteric liquid crystal layer in which the sense of helix is right or left is used. The sense of the reflected circularly polarized light of the cholesteric liquid crystal layer coincides with the sense of helix. All of the senses of helixes of the cholesteric liquid crystal layers having different selective reflection center wavelengths may be the same as each other or different from each other, but it is preferable that all of the senses of helixes of the cholesteric liquid crystal layers are the same as each other.

In addition, a cholesteric liquid crystal layer which exhibits selective reflection in the same or overlapping wavelength region and has different sense of helix is preferably not included in the half-mirror film for displaying a projection image and the laminated glass of the embodiment of the invention. This is to prevent the transmittance in a specific wavelength region from decreasing to, for example, less than 50%.

In a half-width $\Delta\lambda$ (nm) of a selective reflection band exhibiting the selective reflection, $\Delta\lambda$ depends on the birefringence $\Delta n$ of the liquid crystal compound and the pitch P and is in accordance with a relationship of $\Delta\lambda = \Delta n \times P$. Accordingly, the width of the selective reflection band can be controlled by adjusting the value of $\Delta n$. The value of $\Delta n$ can be adjusted by adjusting the type of the polymerizable liquid crystal compound, a mixing ratio, and the like or controlling a temperature at the time of orientation and immobilization.

In order to form one kind of cholesteric liquid crystal layer having the same selective reflection center wavelength, a plurality of cholesteric liquid crystal layers having the same pitch P and the same sense of a helix may be laminated. By laminating the cholesteric liquid crystal layers having the same pitch P and the same sense of a helix, the circularly polarized light selectivity at a specific wavelength can be increased.

In a case of laminating the plurality of cholesteric liquid crystal layers, a cholesteric liquid crystal layer which is separately prepared may be laminated by using an adhesive and the like, or a step of directly applying a liquid crystal composition including a polymerizable liquid crystal compound and the like to the surface of a cholesteric liquid crystal layer which is formed in advance by a method which will be described later, and allowing the orientation and immobilization may be repeatedly performed, and the latter method is preferable.

This is because, by directly forming a subsequent cholesteric liquid crystal layer to the surface of a cholesteric liquid crystal layer formed in advance, an orientation direction of liquid crystal molecules on an air interface side of the cholesteric liquid crystal layer formed in advance and an orientation direction of liquid crystal molecules on a lower side of the cholesteric liquid crystal layer formed thereon coincide with each other, and excellent polarization properties of the laminate of the cholesteric liquid crystal layers are obtained. Furthermore, this is because, interference unevenness which may occur due to uneven thickness of the adhesive layer is not observed.

The thickness of the cholesteric liquid crystal layer is preferably 0.5 to 10 µm, more preferably 1.0 to 8.0 µm, and even more preferably 1.5 to 6.0 µm. Furthermore, the total thickness of the cholesteric liquid crystal layer in the half-mirror for displaying a projection image is preferably 2.0 to 30 µm, more preferably 2.5 to 25 µm, and even more preferably 3.0 to 20 µm.

In the invention, the thickness of the cholesteric liquid crystal layer is within the above range so that high visible light transmittance can be maintained without reducing the thickness of the cholesteric liquid crystal layer.

(Preparation Method of Cholesteric Liquid Crystal Layer)

Hereinafter, preparation materials and a preparation method of the cholesteric liquid crystal layer will be described.

As a material used for formation of the cholesteric liquid crystal layer, a liquid crystal composition including a polymerizable liquid crystal compound and a chiral agent (optically active compound) is used. The liquid crystal composition obtained by further mixing a surfactant or a polymerization initiator, as necessary, and dissolving in a solvent, is applied to a support, an orientation layer, and a cholesteric liquid crystal layer which is an underlayer, causing cholesteric orientation and maturing, performing immobilization by curing the liquid crystal composition, and thus, a cholesteric liquid crystal layer can be formed.

(Polymerizable Liquid Crystal Compound)

The polymerizable liquid crystal compound may be a rod-shaped liquid crystal compound or a disk-shaped liquid crystal compound, and a rod-shaped liquid crystal compound is preferable.

As an example of the rod-shaped polymerizable liquid crystal compound for forming the cholesteric liquid crystal layer, a rod-shaped nematic liquid crystal compound is used. As the rod-shaped nematic liquid crystal compound, azomethines, azoxys, cyanobiphenyls, cyanophenyl esters, benzoic acid esters, cyclohexane carboxylic acid phenyl esters, cyanophenylcyclohexanes, cyano-substituted phenylpyrimidines, alkoxy-substituted phenylpyrimidines, phenyl dioxanes, tolans, and alkenyl cyclohexyl benzonitriles are preferably used. Not only a low-molecular liquid crystal compound, but also a high-molecular liquid crystal compound can be used.

The polymerizable liquid crystal compound is obtained by introducing a polymerizable group to a liquid crystal compound. The examples of a polymerizable group include an unsaturated polymerizable group, an epoxy group, an aziridinyl group, and an unsaturated polymerizable group is preferable, and an ethylenically unsaturated polymerizable group is particularly preferable. The polymerizable group can be introduced into molecules of the liquid crystal compound by various methods. The number of polymerizable groups having the polymerizable liquid crystal compound is preferably 1 to 6 and more preferably 1 to 3 per molecule.

Examples of the polymerizable liquid crystal compound include compounds disclosed in Makromol. Chem., vol. 190, pp. 2255 (1989), Advanced Materials, vol. 5, pp. 107 (1993), U.S. Pat. Nos. 4,683,327A, 5,622,648A, 5,770,107A, WO95/022586A, WO95/024455A, WO97/000600A, WO98/023580A, WO98/052905, JP1989-272551A (JP-H01-272551A), JP1994-016616A (JP-H06-016616A), JP1995-110469A (JP-H07-110469A), JP1999-080081A (JP-H11-080081A), and JP2001-328973A. Two or more kinds of polymerizable liquid crystal compounds may be used in combination. In a case where two or more kinds of polymerizable liquid crystal compounds are used in combination, an orientation temperature can be decreased.

The amount of polymerizable liquid crystal compound added into the liquid crystal composition is preferably 80 to 99.9% by mass, more preferably 85 to 99.5% by mass, and particularly preferably 90 to 99% by mass with respect to the mass of solid contents (mass excluding solvent) of the liquid crystal composition.

(Chiral Agent: Optically Active Compound)

The chiral agent has a function of inducing a helix structure of a cholesteric liquid crystalline phase. Since the induced sense or pitch of the helix is different depending on the compounds, the chiral agent may be selected according to the purpose.

The chiral agent is not particularly limited and known compounds can be used. Examples of chiral agents include compounds described in Liquid Crystal Device Handbooks (Chapter 3, 4-3, Chiral Agents for TN and STN, p. 199, edited by Japan Society for the Promotion of Science, 142 Committee, 1989), JP2003-287623A, JP2002-302487A, JP2002-080478A, JP2002-080851A, JP2010-181852, and JP2014-034581A.

The chiral agent normally includes asymmetric carbon atoms, but an axially asymmetric compound or a plane asymmetric compound not including asymmetric carbon atoms can also be used as the chiral agent. Examples of an axially asymmetric compound or a plane asymmetric compound include binaphthyl, helicene, paracyclophane, and derivatives thereof.

The chiral agent may include a polymerizable group. In a case where both the chiral agent and the liquid crystal compound include a polymerizable group, a polymer having a repeating unit derived from the polymerizable liquid crystal compound and a repeating unit derived from the chiral agent can be formed with a polymerization reaction between the polymerizable chiral agent and the polymerizable liquid crystal compound. In this aspect, the polymerizable group of the polymerizable chiral agent is preferably the same group as the polymerizable group of the polymerizable liquid crystal compound. Accordingly, examples of a polymerizable group of the chiral agent preferably include an unsaturated polymerizable group, an epoxy group, or an aziridinyl group; more preferably include an unsaturated polymerizable group; and even more preferably include an ethylenically unsaturated polymerizable group.

In addition, the chiral agent may be a liquid crystal compound.

As the chiral agent, an isosorbide derivative, an isomannide derivative, a binaphthyl derivative, or the like is preferable. As the isosorbide derivative, a commercially available product such as LC-756 manufactured by BASF Corporation may be used.

The content of the chiral agent in the polymerizable liquid crystal compound is preferably 0.01 to 200 mol % and more preferably 1 to 30 mol % with respect to the amount of the liquid crystal composition.

(Polymerization Initiator)

The liquid crystal composition preferably includes a polymerization initiator. In an aspect of allowing a polymerization reaction with ultraviolet light irradiation, the polymerization initiator used is preferably a photopolymerization initiator capable of starting a polymerization reaction with ultraviolet light irradiation. Examples of the photopolymerization initiator include α-carbonyl compounds (described in each specification of U.S. Pat. Nos. 2,367,661B and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of a triarylimidazole dimer and a p-aminophenylketone (described in U.S. Pat. No. 3,549,367A), acridine and phenazine compounds (described in JP1985-105667A (JP-S60-105667A), U.S. Pat. No. 4,239,850A), acylphosphine oxide compounds (described in JP1988-040799B (JP-S63-040799B), JP1993-029234B (JP-H5-029234B), JP1998-095788A (JP-H10-095788A), JP1998-029997A (JP-H10-029997A), JP2001-233842A, JP2000-080068A, JP2006-342166A, JP2013-114249A, JP2014-137466A, JP4223071B, JP2010-262028A, JP2014-500852), oxime compounds (described in JP2000-066385A and JP4454067B), and oxadiazole compounds (described in U.S. Pat. No. 4,212,970A), and the like. For example, the description of paragraphs [0500] to [0547] of JP2012-208494A can also be referred to.

As the polymerization initiator, it is also preferable to use the acylphosphine oxide compounds or the oxime compounds.

As the acylphosphine oxide compounds, for example, IRGACURE 810 (compound name: bis(2,4,6-trimethylbenzoyl)-phenylphosphine oxide) which is a commercially available product and manufactured by BASF Japan Ltd. can be used. As examples of the oxime compounds, IRGACURE OXE 01 (manufactured by BASF), IRGACURE OXE 02 (manufactured by BASF Corporation), TR-PBG-304 (manufactured by Changzhou Tronly Advanced Electronic Materials Co., Ltd.), Adeka Arkls NCI-831, Adeka Arkls NCI-930 (manufactured by ADEKA CORPORATION), Adeka Arkls NCI-831 (manufactured by ADEKA CORPORATION), and the like which are commercially available products can be used.

The polymerization initiator may be used singly or in combination of two or more kinds thereof.

The content of the photopolymerization initiator in the liquid crystal composition is preferably 0.1% to 20% by mass and more preferably 0.5% to 5% by mass with respect to the content of the polymerizable liquid crystal compound.

(Crosslinking Agent)

The liquid crystal composition may optionally include a crosslinking agent, in order to improve the film hardness and durability after the curing. The crosslinking agent which is cured with ultraviolet light, heat, moisture, and the like can be suitably used.

The crosslinking agent is not particularly limited, and can be suitably selected according to the purpose. Examples thereof include a multifunctional acrylate compound such as trimethylolpropane tri(meth)acrylate, or pentaerythritol tri (meth)acrylate; an epoxy compound such as glycidyl (meth) acrylate, or ethylene glycol diglycidyl ether; an aziridine compound such as 2,2-bishydroxymethylbutanol-tris [3-(1-aziridinyl) propionate], or 4,4-bis(ethyleneiminocarbonylamino) diphenylmethane; an isocyanate compound such as hexamethylene diisocyanate or biuret type isocyanate; a polyoxazoline compound including an oxazoline group in a side chain; an alkoxysilane compound such as vinyltrimethoxysilane or N-(2-aminoethyl) 3-aminopropyltrimethoxysilane. In addition, a well-known catalyst can be used in accordance with reactivity of the crosslinking agent, and it is possible to improve the productivity, in addition to the improvement of the film hardness and durability. These may be used singly or in combination of two or more kinds thereof.

The content of the crosslinking agent is preferably 3% to 20% by mass and more preferably 5% to 15% by mass with respect to the content of the polymerizable liquid crystal compound. By setting the content of the crosslinking agent to 3% by mass or more, the effect of improving a crosslinking density can be obtained, and by setting the content of the crosslinking agent 20% by mass or less, a reduction in the stability of the cholesteric liquid crystal layer can be prevented.

(Orientation Controlling Agent)

An orientation controlling agent which contributes to stably or rapidly setting the cholesteric liquid crystal layer as a cholesteric liquid crystal layer having planar orientation, may be added into the liquid crystal composition. Examples of the orientation controlling agent include a fluorine (meth) acrylate-based polymer disclosed in paragraphs [0018] to [0043] of JP2007-272185A, a compound represented by Formulae (I) to (IV) disclosed in paragraphs [0031] to [0034] of JP2012-203237, a compound disclosed in JP2013-113913A, and the like.

The orientation controlling agent may be used singly or in combination of two or more kinds thereof.

The amount of orientation controlling agent added into the liquid crystal composition is preferably 0.01% to 10% by mass, more preferably 0.01% to 5% by mass, and particularly preferably 0.02% to 1% by mass, with respect to the total mass of the polymerizable liquid crystal compound.

(Other Additives)

In addition, the liquid crystal composition may include at least one kind selected from various additives such as a surfactant for adjusting the surface tension of a coated film and setting an even film thickness, a polymerizable monomer, and the like. Further, a polymerization inhibitor, an antioxidant, an ultraviolet absorber, a light stabilizer, a coloring material, and metal oxide fine particles may be further added into the liquid crystal composition, if necessary, in a range not deteriorating the optical performance.

Regarding the cholesteric liquid crystal layer, a cholesteric liquid crystal layer having immobilized cholesteric regularity can be formed by applying a liquid crystal composition obtained by dissolving a polymerizable liquid crystal compound, a polymerization initiator, and if necessary, a chiral agent, and a surfactant in a solvent, onto a support, an orientation layer, or a cholesteric liquid crystal layer which is prepared in advance, drying the liquid crystal composition to obtain a coated film, and irradiating this coated film with active light to allow polymerization of the cholesteric liquid crystal composition.

In addition, a laminated film formed of the plurality of cholesteric liquid crystal layers can be formed by repeatedly performing the manufacturing step of the cholesteric liquid crystal layer.

(Solvent)

A solvent used for preparing the liquid crystal composition is not particularly limited, and is suitably selected according to the purpose, and an organic solvent is preferably used.

The organic solvent is not particularly limited, and is suitably selected according to the purpose, and examples thereof include ketones, alkyl halides, amides, sulfoxides, heterocyclic compounds, hydrocarbons, esters, and ethers. These may be used singly or in combination of two or more kinds thereof. Among these, ketones are particularly preferable, in a case of considering the load on the environment.

(Coating, Orientation, Polymerization)

A method of applying the liquid crystal composition is not particularly limited, and can be suitably selected according to the purpose, and examples thereof include a wire bar coating method, a curtain coating method, an extrusion coating method, a direct gravure coating method, a reverse gravure coating method, a die coating method, a spin coating method, a dip coating method, a spray coating method, and a slide coating method. In addition, the method can also be performed by transferring the liquid crystal composition which is separately applied onto a support. Liquid crystal molecules are oriented by heating the coated liquid crystal composition. The heating temperature is preferably 200° C. or less and more preferably 130° C. or less. By this orientation treatment, an optical thin film in which the polymerizable liquid crystal compound is twist-oriented so as to have a helix axis in a direction substantially perpendicular to a film surface is obtained.

The oriented liquid crystal compound is further polymerized and thereby the liquid crystal composition can be cured. The polymerization may be any of thermal polymerization and photopolymerization using light irradiation, and photopolymerization is preferable. The light irradiation is preferably performed by using ultraviolet light. An irradiation energy is preferably 20 mJ/cm$^2$ to 50 J/cm$^2$ and more preferably 100 to 1,500 mJ/cm$^2$.

In order to promote a photopolymerization reaction, the light irradiation may be performed under the heating conditions and/or the nitrogen atmosphere. An irradiation ultraviolet light wavelength is preferably 350 to 430 nm. A high polymerization reaction rate is preferable, and a reaction rate is preferably 70% or more and more preferably 80% or more, from a viewpoint of stability. A ratio of consumption of a polymerizable functional group is measured by using $I_R$ absorption spectra, and thereby the polymerization reaction rate can be determined.

[Linearly Polarized Light Reflection Layer]

As the selective reflection layer, a linearly polarized light reflection layer may be used. An example of the linearly polarized light reflection layer includes a polarizer in which thin films having different refractive index anisotropies are laminated.

Similar to the cholesteric liquid crystal layer, the polarizer can have a high visible light transmittance and show the selective reflection center wavelength in a specific wavelength region of 650 to 780 nm. In addition, it is possible to reflect projected light incident obliquely at a wavelength where luminosity factor is high when the head-up display system is used.

As a polarizer in which thin films having different refractive index anisotropies are laminated, for example, the polarizer described in JP1997-506837 (JP-H09-506837) can be used. Specifically, in a case of performing a process under a condition selected in order to obtain the refractive index relation, a polarizer can be formed using a wide variety of materials.

In general, it is necessary that one of a first material has a refractive index different from a refractive index which a second material has, in a selected direction. The difference in the refractive index can be made in a variety of ways including stretch, extrusion molding, or coating during film formation or after film formation. Furthermore, it is preferable to have similar rheological properties (for example, melt viscosity) so that two materials can be co-extruded.

As the polarizer in which thin films having different refractive index anisotropies are laminated, a commercially available product can be used. As the commercially available product, a laminate which is formed by a reflective polarizing plate and a temporary support is preferably used. Examples of the commercially available product include DBEF (manufactured by 3M Company), advanced polarizing film (APF (manufactured by 3M Company)), and the like.

A thickness of the reflective polarizing plate is preferably in the range of 2.0 to 50 μm, more preferably in the range of 8.0 to 30 μm.

<Phase Difference Layer>

The half-mirror film for displaying a projection image (that is, the first aspect of the laminated glass) and the second aspect of the laminated glass of the embodiment of the invention may include a phase difference layer. In particular, the half-mirror film for displaying a projection image and the laminated glass including the cholesteric liquid crystal layer preferably include the phase difference layer.

The phase difference layer is used in combination with the cholesteric liquid crystal layer, so that a projection image can be clearly displayed. It is possible to provide the half-mirror for displaying a projection image that can be provided high brightness and prevent double images in the head-up display system by adjusting an in-plane phase difference and a slow axis direction.

In the half-mirror for displaying a projection image, the phase difference layer is provided on the visible side with respect to all the selective reflection layers (cholesteric liquid crystal layers) when used.

Even in a case where the half-mirror film for displaying a projection image and the laminated glass include the cholesteric liquid crystal layer, the half-mirror film for displaying a projection image and the laminated glass may not include the phase difference layer, for example, in a case where a projector of the head-up display system (image display system) emits a projection image of the circularly polarized light.

The phase difference layer is not particularly limited, and can be suitably selected according to the purpose, and examples thereof include a stretched polycarbonate film, a stretched norbornene-based polymer film, a transparent film in which inorganic particles having birefringence such as strontium carbonate are included and oriented, a film in which the liquid crystal compound is uniaxially oriented and orientationally immobilized, a thin film in which oblique deposition of an inorganic dielectric is performed on a support, and the like.

As the phase difference layer, a film in which the polymerizable liquid crystal compound is uniaxially oriented and orientationally immobilized is preferable. For example, the phase difference layer can be formed following order. A liquid crystal composition including a polymerizable liquid crystal compound is applied on a temporary support or the surface of the orientation layer, the polymerizable liquid crystal compound in the liquid crystal composition is formed in a nematic orientation in a liquid crystal state, and then the polymerizable liquid crystal compound is immobilized by curing to form the phase difference layer. In this case, forming the phase difference layer can be carried out in the same manner as forming the cholesteric liquid crystal layer, except that no chiral agent is added to the liquid crystal composition. However, at the time of forming the nematic orientation after applying the liquid crystal composition, heating temperature is preferably 50° C. to 120° C., and more preferably 60° C. to 100° C.

The phase difference layer may be a layer formed by applying a composition including a high-molecular liquid crystal compound on the temporary support or the surface of the orientation layer or the like, forming the nematic orientation in a liquid crystal state, cooling the composition, and then obtained by immobilizing the orientation.

The thickness of the phase difference layer is preferably 0.2 to 300 μm, more preferably 0.5 to 150 μm, and still more preferably 1.0 to 80 μm. The thickness of the phase difference layer formed from the liquid crystal composition is not particularly limited, and is preferably 0.2 to 10 μm, more preferably 0.5 to 5.0 μm, and still more preferably 1.0 to 2.0 μm.

The slow axis direction of the phase difference layer is preferably determined in accordance with the direction of incidence of the incident ray for displaying a projection image and the sense of a helix of the cholesteric liquid crystal layer, when the windshield glass is used in the head-up display system.

For example, in the first aspect (the half-mirror film for displaying a projection image) and the second aspect of the laminated glass of the embodiment of the invention, when a direction in which the head-up display system is used is determined, a direction of the slow axis can be determined in the following range in accordance with the in-plane phase difference in a case where the incident ray is in a downward (lower vertical direction) direction of the laminated glass (half-mirror film for displaying a projection image) and is incident from the phase difference layer side with respect to the cholesteric liquid crystal layer.

For example, in a case where a phase difference layer having an in-plane phase difference of 250 to 450 nm at the wavelength of 550 nm is used, it is preferable that the slow axis of the phase difference layer is in a range of +30° to +85° or −30° to −85° with respect to the upper vertical direction of the laminated glass (half-mirror for displaying a projection image). In addition, in a case where a phase difference layer having an in-plane phase difference of 50 to 180 nm at the wavelength of 550 nm is used, it is preferable that the slow axis of the phase difference layer is in a range of +120° to +175° or −120° to −175° with respect to the upper vertical direction of the laminated glass.

In the windshield glass (combiner) provided with a vehicle such as an automobile, during normal use, an in-plane direction of the windshield glass (combiner) can be specified by the up and down direction (up and down direction in the vertical direction) and a surface to be the visible side (observer side, driver side, in-vehicle side) based on a driver.

In the specification, the upper vertical direction with respect to the windshield glass, the laminated glass, and the half-mirror film for displaying a projection image means a direction along the vertical direction at the time of use that can be specified as described above in a surface of the visible side of the windshield glass, the laminated glass, and the half-mirror film for displaying a projection image specified as described above.

In addition, in a case where a phase difference layer having an in-plane phase difference of 250 to 450 nm at the wavelength of 550 nm is used, the slow axis of the phase difference layer is preferably in a range of +35° to +70° or −35° to −70° with respect to the upper vertical direction of the laminated glass.

Furthermore, in a case where a phase difference layer having an in-plane phase difference of 50 to 180 nm at the wavelength of 550 nm is used, the slow axis of the phase difference layer is preferably in a range of +125° to +160° or −125° to −160° with respect to the upper vertical direction of the laminated glass.

Regarding the slow axis, + and − defined above mean a clockwise direction and a counterclockwise direction when a viewer position is fixed. The preferred direction depends on the sense of a helix of the cholesteric liquid crystal layer included in the laminated glass (half-mirror film for displaying a projection image).

For example, in a case where the sense of a helix of all the cholesteric liquid crystal layers included in the laminated glass is right, the direction of the slow axis of the phase difference layer may be 30° to 85° or 120° to 175° clockwise in the upper vertical direction as seen from the phase difference layer side with respect to the cholesteric liquid crystal layer. In a case where the sense of a helix of all the cholesteric liquid crystal layers included in the laminated glass is left, the direction of the slow axis of the phase difference layer may be 30° to 85° or 120° to 175° counterclockwise as viewed from the phase difference layer side with respect to the cholesteric liquid crystal layer.

[Second Phase Difference Layer]

The half-mirror film for displaying a projection image and the laminated glass of the embodiment of the invention may include a second phase difference layer in addition to the phase difference layer described above.

In a case of providing the second phase difference layer, the above described phase difference layer (hereinafter, also referred to as a "first phase difference layer"), all the cholesteric liquid crystal layers, and the second phase difference layer are arranged in this order. In particular, the first phase difference layer, the selective reflection layer, and the second phase difference layer may be provided in this order from the visible side.

By including the second phase difference layer at the above position in addition to the first phase difference layer, it is possible to further prevent the generation of double images. In particular, it is possible to further prevent the generation of double images in a case of allowing p-polarized light to incident to form a projection image. The reason why the generation of double images can be further prevented by utilizing the second phase difference layer is presumed that the generation of double images can be further prevented on the basis of the fact that light having a wavelength not in the selective reflection band of the cholesteric liquid crystal layer is polarized and changed through the cholesteric liquid crystal layer, and reflected on the rear surface of the windshield glass.

The in-plane phase difference of the second phase difference layer may be appropriately adjusted in a range of 160 to 460 nm at a wavelength of 550 nm, preferably in a range of 240 to 420 nm.

Materials and a thickness or the like of the second phase difference layer can be selected within the same range as the first phase difference layer.

The slow axis direction of the second phase difference layer is preferably determined in accordance with an incidence direction of incident ray for displaying the projection image and a sense of a helix of the cholesteric liquid crystal layer.

For example, in a case of the second phase difference layer having the in-plane phase difference in a range of 160 to 400 nm at the wavelength of 550 nm, it is preferable that the slow axis is in a range of +10° to +35° or −10° to −35° with respect to the upper vertical direction of the laminated glass (half-mirror film for displaying a projection image). In a case of the second phase difference layer having the in-plane phase difference in a range of 200 to 400 nm at the wavelength of 550 nm, it is preferable that the slow axis is in a range of +100° to +140° or −100° to −140° with respect to the upper vertical direction of the laminated glass.

[Other Layers]

The half-mirror film for displaying a projection image and the laminated glass may include another layer in addition to essential components. All of the other layers are preferably transparent in a visible light region.

In addition, all of the other layers preferably have a low birefringence. In the specification, the expression "low birefringence" means that the in-plane phase difference in a wavelength region where the half-mirror for displaying a projection image in the windshield glass used in the invention shows reflection is 10 nm or less, and the in-plane phase difference is preferably 5 nm or less. In addition, all of the other layers preferably have a small difference in a refractive index from an average refractive index (in-plane average refractive index) of the cholesteric liquid crystal layer. Examples of the other layers include a support, an orientation layer, and an adhesive layer.

(Transparent Support)

In the half-mirror film for displaying a projection image and the first aspect of the laminated glass of the invention, a transparent support is an essential component. On the other hand, in the second aspect of the laminated glass of the invention, as described above, the transparent support may be omitted, and the phase difference layer may also serve as the transparent support. Alternatively, the transparent support may also serve as the phase difference layer.

The transparent support preferably used in the invention has an absolute value of 10 nm or less of the in-plane phase difference at a wavelength of 550 nm, and preferably has an absolute value of the in-plane phase difference of 5 nm or less. The absolute value of a phase difference Rth in the thickness direction is preferably 40 nm or less, and more preferably 30 nm or less. An effect of the invention is enhanced by the fact that the phase difference is small, a disturbance of the polarized light due to the transparent support is reduced, and the in-plane physical characteristics are small.

The transparent support is preferably made of a resin such as cellulose acylate or acrylic, particularly preferably made of a cellulose acylate resin, and above all, preferably made of a triacetyl cellulose resin or a diacetyl cellulose resin.

In the invention, it is preferable that the two glass plates, the half-mirror film, and the intermediate film are in close contact with one another while the transparent support being heated so that the storage elastic modulus of the transparent support is 2.0 GPa or less.

Furthermore, it is also preferable that the two glass plates, the half-mirror film, and the intermediate film are in close contact with one another while the transparent support being heated so that the storage elastic modulus of the half-mirror film (the laminate) including the transparent support is 2.0 GPa or less.

In the second aspect of the laminated glass of the invention, in a case where the heat seal layer is adjacent to the phase difference layer as in the example shown in FIG. 4, since the transparent support 1 is disposed more outside than the selective reflection layer 3, an ultraviolet absorber can also be added to the transparent support 1 and ultraviolet shielding function can also be provided.

The thickness of the transparent support may be approximately 5.0 to 1,000 µm, is preferably 10 to 250 µm, and more preferably 15 to 90 µm.

(Heat Seal Layer)

In the half-mirror film for displaying a projection image and the first aspect of the laminated glass of the invention, a heat seal layer is disposed on an opposite side to a surface having the selective reflection layer in the transparent support used for the half-mirror film for displaying a projection image.

In the second aspect of the laminated glass of the invention, the half-mirror film and the intermediate film are sandwiched by a glass plate on the half-mirror film side and a glass plate on the intermediate film side, and the heat seal layer has a thermoplastic resin, is formed between the half-mirror film and the glass plate on the half-mirror film side, and has a thickness of 0.1 to 50 µm.

In the half-mirror film for displaying a projection image and the first aspect of the laminated glass of the invention, the "heat seal layer" is a layer for bonding the transparent support of the half-mirror film for displaying a projection image and the glass plate physically, and having the thermoplastic resin which is included in the heat seal layer and functions as a fusion welding function by heating at the time of preparing the laminated glass. In the second aspect of the laminated glass of the invention, the "heat seal layer" is a layer to be physically bonded with a layer adjacent to the glass plate, and having the thermoplastic resin which is included in the heat seal layer and functions as the fusion welding function by heating during preparation of the laminated glass.

In the invention, sliding properties between the half-mirror film and the glass plate of the laminated glass are ensured by providing the heat seal layer, and the two glass plates, the half-mirror film, and the intermediate film can be closely in contact with one another while the laminated glass is heated. Therefore, the half-mirror film and the glass plate can be tightly adhered closely in contact with each other while suppressing generation of wrinkles during preparation.

In particular, in the half-mirror film for displaying a projection image and the first aspect of the laminated glass of the invention, a component of the transparent support and a component of the heat seal layer are mixed between the transparent support and the heat seal layer to form a mixed layer, so that the adhesiveness between the transparent support and the heat seal layer is also strengthened and a peeling failure inside the laminated glass is prevented.

In addition, in the second aspect of the laminated glass of the invention, in a case where the transparent support and the heat seal layer are adjacent to each other, it is preferable to form the same mixed layer between the transparent support and the heat seal layer, so that the adhesiveness between the transparent support and the heat seal layer is also strengthened and the peeling failure inside the laminated glass can be prevented (see, FIG. 5).

In the second aspect of the laminated glass of the invention, it is preferable that the half-mirror film has the selective reflection layer that reflects light in a wavelength selective manner and the phase difference layer, and the heat seal layer is adjacent to the selective reflection layer or the phase difference layer, and more preferable that the heat seal layer is adjacent to the selective reflection layer. In particular, in a case where the selective reflection layer and the phase difference layer are formed by a cured liquid crystal layer, the surface of the heat seal layer adjacent to the selective reflection layer and the phase difference layer is smoothed. Therefore, wrinkles during preparation of laminated glass are hardly generated, and thus preferable.

Here, in a case where the heat seal layer is adjacent to the selective reflection layer or the phase difference layer, the heat seal layer and the selective reflection layer or the phase difference layer may be in direct contact with each other, and may be indirect contact with each other by sandwiching an adhesive layer or the like therebetween.

In the second aspect of the laminated glass of the invention, the thickness of the heat seal layer is 0.1 to 50 µm, preferably 0.1 to 25 µm, more preferably 0.1 to 10 µm, and even more preferably 0.1 to 5.0 µm, and particularly preferably 0.1 to 3.0 µm.

In addition, in the second aspect of the laminated glass of the invention, as described above, it is not necessary to have the transparent support adjacent to the heat seal layer, or the mixed layer between the phase difference layer or the selective reflection layer and the heat seal layer. In this case, excellent adhesiveness between both of the heat seal layer and a layer adjacent to the heat seal layer can be obtained by using an adhesiveness enhancer which chemically bonds the heat seal layer and the layer adjacent to the heat seal layer at the interface therebetween, or by a crosslinking agent contained in the heat seal layer and/or the layer adjacent to the heat seal layer.

Furthermore, as described above, in the second aspect of the laminated glass of the invention, the transparent support may be omitted. In this case, for example, the phase difference layer may also serve as the transparent support. In the second aspect of the laminated glass of the invention, in a case where the phase difference layer also serves as the transparent support, it is preferable that a film containing birefringent thermoplastic resins such as cellulose acylate, acrylic, and cyclic olefin is subjected to stretch processing so as to exhibit the phase difference in the above described preferable range. In particular, a phase difference layer formed of a cellulose acylate resin from among birefringent thermoplastic resins is preferable, and a phase difference layer formed of a triacetyl cellulose resin or an acetyl cellulose resin is particularly preferable.

[Thermoplastic Resin Contained in Heat Seal Layer]

The heat seal layer contains a thermoplastic resin. The heat seal layer is preferably transparent. In addition, the thermoplastic resin is preferably an amorphous resin.

As the thermoplastic resin, a resin having excellent affinity and adhesiveness to the glass plate is preferable. A resin selected from the group consisting of a polyvinyl acetal resin represented by a polyvinylbutyral (PVB) resin, an ethylene-vinyl acetate copolymer, and a chlorine containing resin can be used. The main component of the heat seal layer is preferably the above-described resin. The main component means a component occupying a ratio of 50% by mass or more of the total mass of the heat seal layer.

In the above described resins, the polyvinylacetal resin represented by the polyvinylbutyral resin or the ethylene-vinyl acetate copolymer is preferable, and the polyvinyl acetal resin represented by the polyvinylbutyral resin (also known as alkylacetalized polyvinyl alcohol) is more preferable. The resin is preferably a synthesis resin.

Polyvinylbutyral can be obtained by acetalizing polyvinyl alcohol with butyraldehyde. A preferable lower limit of the degree of acetalizing of the polyvinyl acetal resin represented by the polyvinylbutyral resin is 40%, a preferable upper limit thereof is 85%, a more preferable lower limit thereof is 60%, and a more preferable upper limit is 80%.

The polyvinyl alcohol used as a raw material for these resins is normally obtained by saponification of polyvinyl acetate, and polyvinyl alcohol having a degree of saponification of 80 to 99.8 mol % is generally used.

In addition, a preferable lower limit of the degree of polymerization of polyvinyl alcohol is 200 and a preferable upper limit thereof is 10,000. In a case where the degree of polymerization of polyvinyl alcohol is 200 or more, the penetration resistance of the obtained laminated glass is unlikely to be lowered. In a case where the degree is 10,000 or less, the resin film has good moldability, and the stiffness of the resin film does not become too large. Thus, a good workability is achieved. A more preferable lower limit thereof is 500 and a more preferable upper limit is 5,000. The degree of polymerization means an average degree of polymerization.

Examples of the polyvinyl acetal resin preferably used for the heat seal layer include KS-10, KS-1, KS-3, and KS-5 manufactured by Sekisui Chemical Co., Ltd. The polyvinyl acetal resins tend to form a mixed layer with the transparent support when the transparent support is coated with the polyvinyl acetal resins. In particular, KS-3 and KS-5 having a calculated molecular weight of 100,000 or more can be preferably used from the viewpoint of excellent adhesiveness for the transparent support.

In addition, in order to coat the heat seal layer to be a thin layer, it is important that a coating solution has a low viscosity. From the viewpoint, the calculated molecular weight is preferably 10,000 or more and 50,000 or less, and KS-10 and KS-1 are preferred. In the invention, the calculated molecular weight is defined as a value obtained by multiplying the average degree of polymerization of polyvinyl alcohol which is the raw material by the molecular weight of the acetalized unit.

An aspect in which the heat seal layer also includes a crosslinking agent that cross-links the polyvinyl alcohol unit in the polyvinyl acetal resin structure, in addition to the polyvinyl acetal resin is also preferable.

Examples of the crosslinking agent include an epoxy-based additive. In particular, a compound having two or more epoxy groups in one molecule is preferable, and a compound represented by the following General Formula (EP1) is preferable.

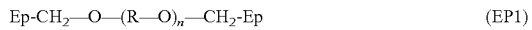

$$\text{Ep-CH}_2\text{—O—(R—O)}_n\text{—CH}_2\text{-Ep} \quad \text{(EP1)}$$

In the above General Formula (EP1), Ep is an epoxy group, R is an alkylene group having 2 to 4 carbon atoms, and n is 1 to 30. Here, in a case where n is 2 or more, a plurality of R may be the same or different.

Specific examples of the compound represented by General Formula (EP1) include Denacol EX-810, 811, 821, 830, 832, 841, 850, 851, 861, 911, 920, 931, 941, and the like manufactured by Nagase ChemteX Corporation.

In a case where the epoxy-based additive is used as the crosslinking agent, a cationic polymerization initiator (photoacid generator) which is an onium salt composed of a cationic site having light-absorbing properties and an anionic site to be an acid generating source can be used, and a sulfonium salt-based cationic polymerization initiator or an iodonium salt-based cationic polymerization initiator can be used. In particular, the iodonium-based cationic polymerization initiator is preferred.

[Solvent of Coating Composition for Heat Seal Layer]

In the invention, a coating composition for forming the heat seal layer contains 30% to 70% by mass of at least one solvent having permeability into the transparent support with respect to the total amount of the solvent.

The "permeability" with respect to the transparent support means that a solvent penetrates into the transparent support in a case where the transparent support is coated with the solvent. In addition, the solvent penetrates into the transparent support, and as a result, the transparent support may be swellable. The permeable solvent penetrates into the transparent support, so that the mixed layer in which the component of the heat seal layer and the component of the transparent support are mixed is formed between the heat seal layer and the transparent support when the heat seal layer is coated.

In a case where the transparent support is triacetyl cellulose, specific examples of the solvent having permeability with respect to the transparent support include ketones such as acetone, methyl ethyl ketone, cyclohexanone, methyl isobutyl ketone, and diacetone alcohol; esters such as methyl formate, methyl acetate, ethyl acetate, butyl acetate, and ethyl lactate; nitrogen-containing compounds such as nitromethane, acetonitrile, N-methylpyrrolidone, and N,N-dimethylformamide; glycols such as methyl glycol, and methyl glycol acetate; ethers such as tetrahydrofuran, 1,4-dioxane, dioxolane, and diisopropylether; halogenated hydrocarbons such as methylenechloride, chloroform, and tetrachloroethane; glycol ethers such as methyl cellosolve, ethyl cellosolve, butyl cellosolve, and cellosolve acetate; dimethylsulfoxide, propylenecarbonate, and the like; and mixtures thereof preferably include esters, ketones such as methyl acetate, ethyl acetate, butyl acetate, and methyl ethyl ketone. In addition, alcohols such as methanol, ethanol, isopropyl alcohol, butanol, and isobutyl alcohol, and aromatic hydrocarbons such as toluene and xylene can also be used by mixing with the above described permeable solvent.

As described above, in the laminated glass of the second aspect of the invention, the heat seal layer is preferably adjacent to the selective reflection layer or the phase difference layer.

In this case, the above-described resins are preferably used as the thermoplastic resin contained in the heat seal layer.

The solvent of the coating composition for the heat seal layer is preferably a solvent that dissolves the thermoplastic resin contained in the heat seal layer, and in a case of polyvinylbutyral, examples thereof include alcohols such as methanol, ethanol, isopropyl alcohol, butanol, isobutyl alcohol, and diacetone alcohol; aromatic hydrocarbons such as toluene and xylene; glycol ethers such as methyl cellosolve, ethyl cellosolve, butyl cellosolve, and cellosolve acetate; ketones such as acetone, methyl ethyl ketone, cyclohexanone, methyl isobutyl ketone, diisobutyl ketone, and isophorone; amides such as N,N-dimethylacetamide, N,N-dimethylformamide, and N-methyl-2-pyrrolidone; esters such as methyl formate, methyl acetate, ethyl acetate, butyl acetate, and ethyl lactate; ethers such as tetrahydrofuran, 1,4-dioxane, dioxolane, diisopropyl ether, and ethyl ether; halogenated hydrocarbons such as methylenechloride, chloroform, and tetrachloroethane; nitrogen-containing compounds such as nitromethane, acetonitrile, N-methylpyrrolidone, and N,N-dimethylformamide, glycols such as methyl glycol, and methyl glycol acetate; dimethyl sulfoxide, propylene carbonate, water, and the like; or a mixture thereof.

In order to improve the adhesiveness between the heat seal layer and any one of the selective reflection layer or the phase difference layer, the polymerization reaction rate in a case of preparing any one of the selective reflection layer or the phase difference layer adjacent to the heat seal layer is adjusted to 70% or less. Therefore, a part of the heat seal layer penetrates into a surface of any one of the selective reflection layer or the phase difference layer, and the adhesiveness can be improved. The polymerization reaction rate is preferably 5% to 60%, more preferably 10% to 40%. That is, in the second aspect of the laminated glass of the invention, a mixed layer in which the components of both layers are mixed may be provided between the heat seal layer and the phase difference layer, or between the heat seal layer and the selective reflection layer.

Furthermore, in order to improve the adhesiveness between the heat seal layer and any one of the selective reflection layer or the phase difference layer, the crosslinking agent is added to the heat seal layer in addition to adjusting the polymerization reaction rate in a case of preparing any one of the selective reflection layer or the phase difference layer adjacent to the heat seal layer to 70% or less. As the crosslinking agent, the aforementioned crosslinking agent that can be added as the liquid crystal composition is preferable. In this case, a polymerization initiator for initiating and promoting crosslinking can also be added. In an aspect of allowing a polymerization reaction with ultraviolet light irradiation, the used polymerization initiator is preferably the above described photopolymerization initiator capable of starting a polymerization reaction with ultraviolet light irradiation.

The addition amount of the crosslinking agent is preferably set within a range of 0.01% to 50%, and more preferably 0.1% to 30% with respect to the thermoplastic resin, since the adhesiveness with the glass is lowered in a case where the addition amount is too large.

The adhesiveness can be further improved by promoting the reaction so that the heat seal layer and the selective reflection layer or the phase difference layer are also crosslinked during the preparation of the heat seal layer.

In a case of ultraviolet light irradiation, it is preferable that a ultraviolet light irradiation amount during the formation of the selective reflection layer in contact with the heat seal layer is set so that the polymerization reaction rate is 70% or less, the ultraviolet light irradiation is performed again during the formation of the heat seal layer, and the crosslinking between the heat seal layer and the selective reflection layer is promoted. Here, the polymerization reaction rate can be determined by a ratio of consumption of a polymerizable functional group obtained using $I_R$ absorption spectra.

[Roughening of Heat Seal Layer]

In the invention, a surface of the heat seal layer is preferably roughened in order to improve sliding properties between the half-mirror film and the glass plate of the laminated glass.

As a preferable means for roughening the surface of the heat seal layer, an appropriate amount of water may be used as a solvent for the coating composition which is used for forming the heat seal layer. It is considered that by using water, the surface is roughened due to the action of water vapor in a case where the heat seal layer is dried and solidified. A preferable amount of water in the coating composition of the heat seal layer is 2% to 8% by mass with respect to the total solvent.

Furthermore, as other preferable means for roughening the surface of the heat seal layer, an appropriate amount of inorganic fine particles containing at least one kind of silica (silicon dioxide), aluminum oxide, titanium dioxide, zirconium oxide, calcium carbonate, talc, clay, calcined kaolin, calcined calcium silicate, hydrated calcium silicate, aluminum silicate, magnesium silicate, calcium phosphate, or the like may be added in the heat seal layer. In this case, the added inorganic fine particles are distributed on the surface of the heat seal layer, so that the surface becomes rough.

The inorganic fine particles added to the heat seal layer are preferably inorganic oxide fine particles, more preferably silica (silicon dioxide), aluminum oxide, titanium dioxide, or zirconium oxide.

The inorganic fine particles added to the heat seal layer is preferably formed by a primary particle and forms a secondary particle formed by aggregation of the primary particles.

The inorganic fine particles added to the heat seal layer are preferably inorganic fine particles having the average primary particle diameter of 5 to 50 nm and the average secondary particle diameter of 100 to 500 nm, and in particular, the average secondary particle diameter is more preferably 150 to 400 nm. As the inorganic fine particles added to the heat seal layer, silica particles are preferable. For example, a commercially available composition containing silica fine particles (commercially available colloidal silica dispersion liquid) can be used as it is or by adding an organic solvent optionally.

The preferred amount of inorganic fine particles (solid content) in the coating composition of the heat seal layer is preferably 1% to 40% by mass, more preferably 3% to 30% by mass with respect to the total solid content of the heat seal layer.

Furthermore, in a case of forming a heat seal layer, it is preferable that there is a low amount of residual solvent from a viewpoint of adhesiveness and sliding properties. As a method of reducing the amount of residual solvent, it is preferable to increase the temperature when drying or lengthen the drying time. The drying temperature is preferably the boiling point of the used solvent or higher and 200° C. or lower, more preferably 80° C. to 150° C. The drying time is preferably 0.2 minutes to 300 minutes, more preferably 0.5 minutes to 10 minutes. It is also preferable to leave the heat seal layer for 1 day or more under an atmospheric pressure environment after forming the heat seal layer.

The average primary particle diameter of the inorganic fine particles described above is a value measured for inorganic fine particles contained in a dispersion composition thereof or inorganic fine particles contained in the heat seal layer.

The measurement is performed by observation with a transmission type electron microscope. Specifically, in any 50 selected primary particles, a diameter of a circle circumscribing the primary particles is obtained, and an arithmetic average is set as the average primary particle diameter. An observation magnification of the transmission type electron microscope is set to any magnification capable of determining the primary particle diameter between 500,000 times and 5,000,000 times.

The average secondary particle diameter of the inorganic fine particles described above is a value measured by performing fitting of a perfectly spherical shape (refractive index of 1.46) using a laser diffraction scattering particle diameter distribution measurement device. As a measurement device, for example, MicroTrac MT3000 manufactured by MicrotracBEL Corp. can be used.

(Adhesiveness Enhancer)

A compound (hereinafter, also referred to as an adhesiveness enhancer) having a plurality of groups selected from the group consisting of a polymerizable group and a group capable of forming a bond with the resin contained in the transparent support has a function to strengthen the adhesiveness between the heat seal layer and the transparent support. In addition, it is one of the preferable aspects of the invention that at least one of the transparent support or the heat seal layer contains a component derived from the above described adhesiveness enhancer. The component derived from the above described adhesiveness enhancer means a component obtained by a reaction of a group selected from the group consisting of a polymerizable group and a group capable of forming a bond with the resin contained in the transparent support in the adhesiveness enhancer. For example, the adhesiveness enhancer is contained in a coating solution for forming the heat seal layer, so that the component derived from the adhesiveness enhancer is included in the formed heat seal layer.

In the adhesiveness enhancer, a definition of the polymerizable group is as described above. The number of polymerizable groups is not particularly limited, and may be one or plural (two or more). However, in a case where the adhesiveness enhancer does not contain a group capable of forming a bond with the resin contained in the transparent support, the adhesiveness enhancer has a plurality of polymerizable groups.

The adhesiveness enhancer can be selected specifically from commercially available monomers and oligomers having the plurality of polymerizable groups, and in particular, the adhesiveness enhancer preferably has three or more polymerizable groups. Examples of the monomers or oligomers include U6HA (hexafunctional urethane acrylate oligomer) manufactured by Shin-Nakamura Chemical Co., Ltd., and PET-30 manufactured by Nippon Kayaku Co., Ltd.

In a case where the adhesiveness enhancer has the polymerizable group, it is preferable to select and use the above described polymerization initiator appropriately.

The group capable of forming a bond with the resin contained in the transparent support contained in the adhesiveness enhancer (hereinafter, also referred to as a reactive group) means a group capable of chemically adsorbing to the resin contained in the transparent support by interacting with a group which a material constituting the resin contained in the transparent support has.

Examples of the reactive group include a boronic acid group, a boronic acid ester group, a oxiranyl group, a oxetanyl group, a hydroxyl group, a carboxyl group, a isocyanate group, —SiX$_3$ (where, X represents halogen, an alkoxy group, or an alkyl group, and at least one thereof is halogen or an alkoxy group), and the like. In particular, in a case where the resin contained in the transparent support described above is a partially saponified cellulose ester resin, the reactive group is preferably a group capable of forming a bond with the hydroxyl group remaining in the cellulose ester resin in the exemplified groups (for example, a boronic acid group, a boronic acid ester group, an isocyanate group, and —SiX$_3$), and more preferably a boronic acid group, a boronic acid ester group, or an isocyanate group. The number of reactive groups is not particularly limited, and may be one or plural (two or more).

The adhesiveness enhancer may be a compound having only a plurality of polymerizable groups or a compound having only a plurality of groups capable of forming a bond with the resin contained in the transparent support. A commercially available multifunctional monomer compound can be used as the compound having only a plurality of polymerizable groups. An example of the compound having only a plurality of groups capable of forming a bond with the resin contained in the transparent support includes polyisocyanate, and as an example of polyisocyanate, Coronate L manufactured by Tosoh Corporation.

The adhesiveness enhancer is preferably a compound having at least one polymerizable group in the molecule and having at least one group capable of forming a bond with the resin contained in the transparent support in the molecule, in terms of high adhesiveness between the transparent support and the heat seal layer.

In addition, in a case where a mixed layer is formed between the transparent support and the heat seal layer, adhesiveness by the adhesiveness enhancer is largely increased, that is, the mixed layer is formed, and it is preferable to use the adhesiveness enhancer due to a synergistic effect.

The most preferred aspect of the adhesiveness enhancer includes a compound represented by Formula (A) from the viewpoint that the adhesiveness between the transparent support and the heat seal layer is further excellent.

 Formula (A)

In Formula (A), Z represents a substituent having a polymerizable group. The definition of the polymerizable group is as described above. Specific examples of the substituent having the polymerizable group preferably include a substituent containing a (meth)acryloyl group, a styryl group, a vinyl ketone group, a vinyl group, a butadiene group, a vinyl ether group, an oxiranyl group, an aziridinyl group, an oxetanyl group, and the like; more preferably a substituent containing a (meth)acryloyl group, a styryl group, a vinyl group, an oxiranyl group, an oxetanyl group, and the like; even more preferably a substituent containing a (meth)acryloyl group and a styryl group, and particularly preferably a substituent containing a (meth)acryloyl group.

Furthermore, Z is preferably a group represented by the following Formula (II), or a substituent having an oxiranyl group or an oxetanyl group.

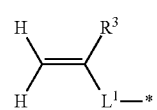 Formula (II)

In Formula (II), R$^3$ is a hydrogen atom or a methyl group, and preferably a hydrogen atom.

L$^1$ represents a single bond, or a divalent linking group selected from —O—, —CO—, —NH—, —CO—NH—, —COO—, —O—COO—, an alkylene group, an arylene group, a heterocyclic group (a heteroaryl group), and a combination thereof, preferably a single bond, —CO—

NH—, or —COO—, and most preferably a single bond or —CO—NH—. * represents a binding position.

In Formula (A), Q is a group capable of forming a bond with the resin contained in the transparent support. The definition of the group is as described above.

In Formula (A), X represents an n+1 valent linking group. n represents an integer of 1 to 4, more preferably 1.

In a case where n is 1, X represents a divalent linking group, for example, —O—, —CO—, —NH—, —CO—NH—, —COO—, —O—COO—, an alkylene group, an arylene group, a heteroaryl group, and a divalent linking group selected from a combination thereof are preferable, and a substituted or unsubstituted arylene group is more preferable.

X is preferably —COO-arylene group-, -arylene group-, —CONH-arylene group-, and more preferably —COO-arylene group-.

The compound represented by Formula (A) preferably contains at least one boron atom, and a compound represented by the following Formula (I) is preferable.

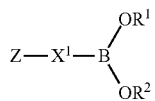

Formula (I)

In Formula (I), $R^1$ and $R^2$ each independently represent a hydrogen atom, a substituted or unsubstituted aliphatic hydrocarbon group, an aryl group, or a heteroaryl group.

$R^1$ and $R^2$ may be linked to each other via a linking group consisting of an alkylene group, an arylene group, or a combination thereof.

In Formula (I), the definitions of Z and $X^1$ are as described above.

In Formula (I), the substituted or unsubstituted aliphatic hydrocarbon group represented by $R^1$ and $R^2$ includes a substituted or unsubstituted alkyl group, alkenyl group, and alkynyl group.

Specific examples of the alkyl group include linear, branched, or cyclic alkyl groups such as a methyl group, an ethyl group, a propyl group, a butyl group, a pentyl group, a hexyl group, a heptyl group, an octyl group, an nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, an neopentyl group, a 1-methylbutyl group, an isohexyl group, a 2-methylhexyl group, a cyclopentyl group, a cyclohexyl group, a 1-adamantyl group, and a 2-norbornyl group.

Specific examples of the alkenyl group include linear, branched, or cyclic alkenyl groups such as a vinyl group, a 1-propenyl group, a 1-butenyl group, a 1-methyl-1-propenyl group, a 1-cyclopentenyl group, and a 1-cyclohexenyl group. Specific examples of the alkynyl group include an ethynyl group, a 1-propynyl group, a 1-butynyl group, a 1-octynyl group, and the like.

Specific examples of the aryl group can include a group in which one to four benzene rings form a fused ring and a group in which benzene ring and unsaturated five-membered ring form a fused ring, and specific examples include a phenyl group, a naphthyl group, an anthryl group, a phenanthryl group, an indenyl group, an acenaphthenyl group, a fluorenyl group, a pyrenyl group, and the like.

$R^1$, $R^2$, and $X^1$ may be further substituted with one or more substituents, if possible. The kinds of the substituent are not particularly limited, and examples thereof include a substituent group Y exemplified in paragraph 0054 of JP-A-2006-309120.

Although the specific examples of the adhesiveness enhancer are shown below, the invention is not limited thereto.

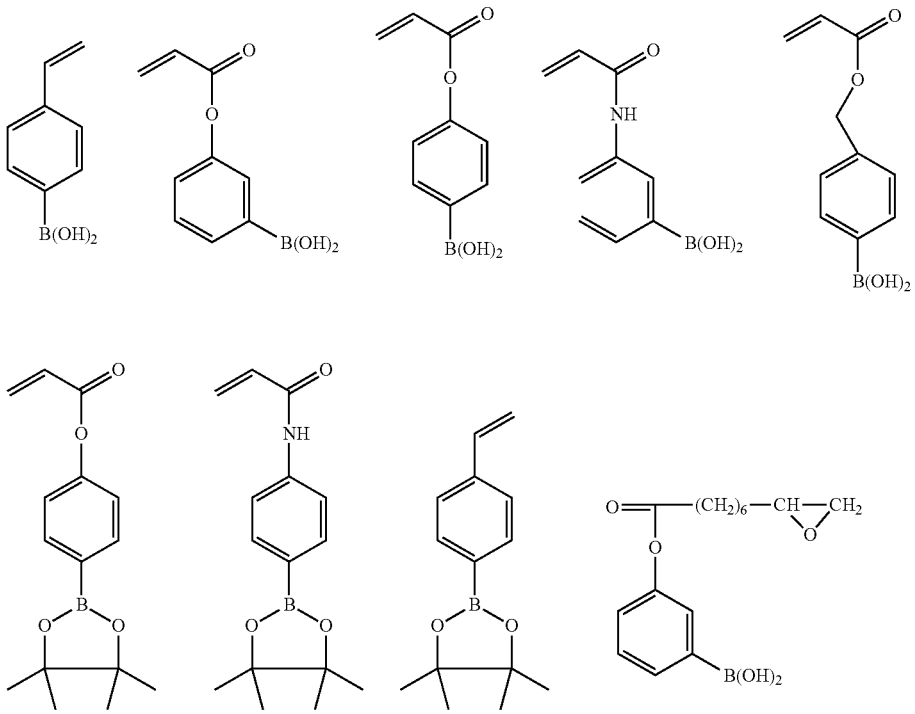

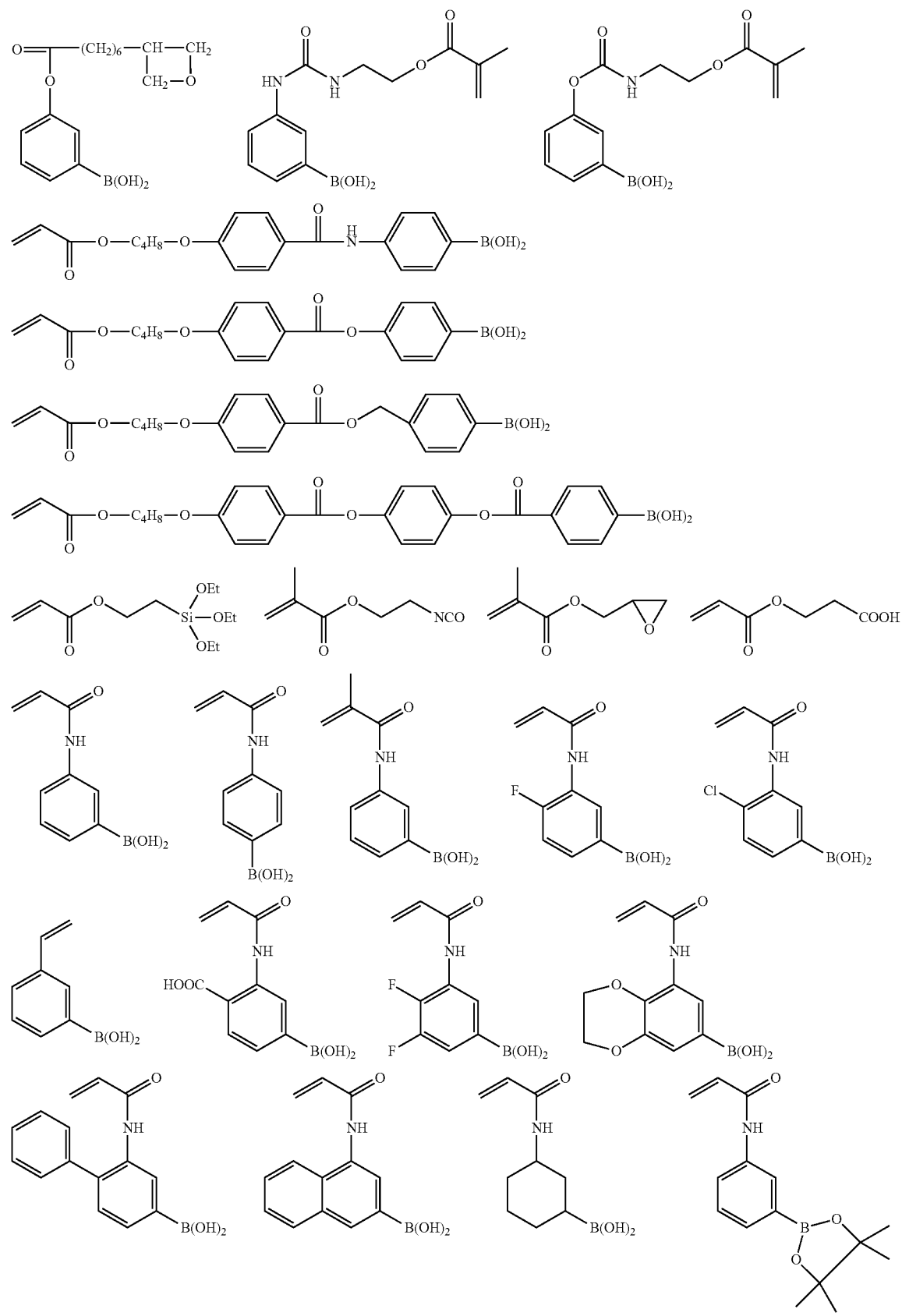

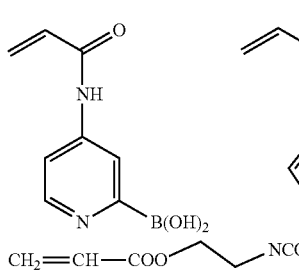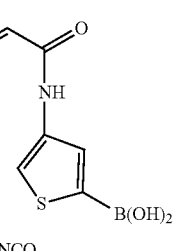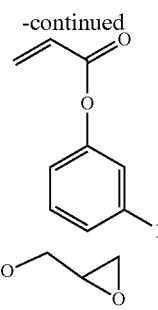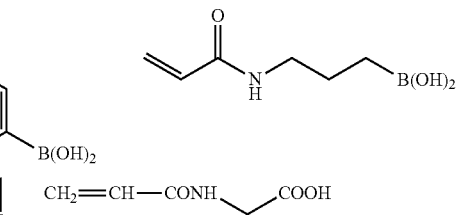

-continued (Orientation Layer)

The half-mirror for displaying a projection image may include an orientation layer as an underlayer onto which the liquid crystal composition is applied when forming the cholesteric liquid crystal layer or the phase difference layer.

The orientation layer may be provided by methods such as a rubbing treatment of an organic compound (resin such as polyimide, polyvinyl alcohol, polyester, polyallylate, polyamideimide, polyetherimide, polyamide, and modified polyamide) such as a polymer, oblique vapor deposition of an inorganic compound, formation of a layer having a microgroove, or accumulation of an organic compound (for example, ω-tricosanoic acid, dioctadecyl methyl ammonium chloride, and methyl stearate) by using a Langmuir-Blodgett technique (LB film). In addition, an orientation layer exhibiting an orientation function by applying an electric field, applying a magnetic field, or light irradiation may be used.

Particularly, an orientation layer formed of a polymer is preferably subjected to the rubbing treatment, and the liquid crystal composition is preferably applied onto the surface subjected to the rubbing treatment. The rubbing treatment can be performed by rubbing a surface of a polymer layer in a constant direction with paper or cloth several times.

The liquid crystal composition may be applied to the surface of the support or the surface of the support which is subjected to the rubbing treatment, without providing the orientation layer.

In a case of forming a liquid crystal layer by using the temporary support, the orientation layer may be peeled off with the temporary support and may not be a layer constituting the half-mirror for displaying a projection image.

A thickness of the orientation layer is preferably 0.01 to 5.0 μm and more preferably 0.05 to 2.0 μm.

(Adhesive Layer)

The adhesive layer may be provided, for example, between the cholesteric liquid crystal layers, between the selective reflection layer (cholesteric liquid crystal layer) and the phase difference layer, between the selective reflection layer and the second phase difference layer, and between the selective reflection layer and the transparent support. In addition, the adhesive layer may be provided between the selective reflection layer and the intermediate film, between the phase difference layer (the first or second phase difference layer) and the intermediate film, and the like.

The adhesive layer may be formed of an adhesive.

From a viewpoint of a curing method, the adhesive includes a hot melt type adhesive, a thermosetting adhesive, a photocuring adhesive, a reaction curing type adhesive, and pressure-sensitive type adhesive which does not need curing. As materials, acrylate-based, urethane-based, urethane acrylate-based, epoxy-based, epoxy acrylate-based, polyolefin-based, modified olefin-based, polypropylene-based, ethylene-vinyl alcohol-based, vinyl chloride-based, chloroprene rubber-based, cyanoacrylate-based, polyamide-based, polyimide-based, polystyrene-based, polyvinylbutyral-based compounds can be used. From viewpoints of workability and productivity, a photocuring method is preferable as a curing method, and from viewpoints of optical transparency and heat resistance, the acrylate-based, urethane acrylate-based, and epoxy acrylate-based compounds are preferably used as the material.

The adhesive layer may be formed using a highly transparent adhesive transfer tape (OCA tape). A commercially available product for an image display device, in particular, a commercially available product for the surface of the image display portion of an image display device may be used as the highly transparent adhesive transfer tape. Examples of commercially available products include pressure sensitive adhesive sheets (such as PD-S1) manufactured by Panac Corporation, and pressure sensitive adhesive sheets of MHM series manufactured by NICHIEI KAKOH CO., LTD.

A thickness of the adhesive layer is preferably 0.5 to 10 μm and more preferably 1.0 to 5.0 μm. The thickness of the adhesive layer formed by using the OCA tape may be 10 μm to 50 μm, preferably 15 μm to 30 μm. The adhesive layer is preferably provided to have an even film thickness, in order to reduce the color unevenness and the like of the half-mirror for displaying a projection image.

<Windshield Glass>

A windshield glass which has a projection image display function can be provided using the laminated glass of the embodiment of the invention.

In the specification, a windshield glass generally means a window glass of wheeled vehicles such as cars and trains, and vehicles such as airplanes, ships, and play equipment. The windshield glass is preferably the front glass in a travelling direction of the vehicles. The windshield glass is preferably the front glass of wheeled vehicles.

The visible light transmittance of the windshield glass is preferably 70% or more, more preferably more than 70%, even more preferably 75% or more, and particularly preferably 80% or more. The visible light transmittance is preferably satisfied at any position of the windshield glass, and in particular, the projection image display portion preferably satisfies the above described visible light transmittance.

As described above, since the laminated glass (half-mirror film for displaying a projection image) of the embodiment of the invention has high visible light transmittance in a wavelength region having high luminosity factor, even in a case where any kind of glass generally used is used as a windshield glass, the above described visible light transmittance can be satisfied.

The windshield glass (the laminated glass of the embodiment of the invention) may be planar. In addition, the windshield glass (the laminated glass of the embodiment of the invention) may be formed for a built-in windshield glass for a vehicle to which the windshield is applied, and may have, for example, a curved surface.

The thickness of the windshield glass may be uniform or non-uniform in the projection image display portion. For example, the windshield glass may have a wedge-shaped cross section and the thickness of the projection image display portion may be non-uniform as the glass for vehicles described in JP2011-505330A, but the thickness of the projection image display portion is preferable to be uniform.

[Projection Image Display Portion]

The half-mirror film for displaying a projection image of the embodiment of the invention and the half-mirror film in the second aspect of the laminated glass of the invention may be provided at the projection image display portion of the windshield glass. Hereinafter, the half-mirror film for displaying a projection image of the embodiment of the invention and the half-mirror film in the second aspect of the laminated glass of the invention are collectively referred to as a half-mirror film.

The projection image display portion can be formed by providing the half-mirror film on an outer surface of a glass plate of the windshield glass, or by providing the half-mirror film between two glass plates in the windshield glass (laminated glass). In a case where the half-mirror film is provided on the outer surface of the glass plate of the windshield glass, the half-mirror film may be provided on the visible side seen from the glass plate or on the opposite side thereof, and it is preferable that the half-mirror film is provided on the visible side. More preferably, the half-mirror film is provided between the two glass plates. This is because the half-mirror film having low scratch resistance compared with the glass plate is protected.

In the specification, the projection image display portion is a portion that can display a projection image with reflected light, and may be a portion that can display a projection image projected from a projector or the like in a visible manner.

The projection image display portion functions as a combiner of a head-up display system. In the head-up display system, the combiner means an optical member that can display a screen image projected from a projector in a visible manner, and in a case where the combiner is observed from the same surface side on which the screen image is displayed, information or outside views on a surface side opposite to the surface side on which the screen image is displayed can be observed at the same time. That is, the combiner functions as an optical path combiner for superimposing and displaying external light and image light.

The projection image display portion (combiner) may be formed on the entire surface of the windshield glass or may be formed on a part of the entire area of the windshield glass. In a case where the projection image display portion is partially formed, the projection image display portion may be provided at any position on the windshield glass, and the projection image display portion is preferably provided so that a virtual image is displayed at a position where the projection image can be easily visible from an observer (for example, a driver), in a case where the windshield glass is used in a head-up display system. For example, the position where the projection image display portion is provided may be determined in accordance with the relationship between a position of a driver's seat of a vehicle subjected to be applied, and a position where a projector is installed.

The projection image display portion may have a flat surface shape without a curved surface, or may include a curved surface. In addition, the whole projection image display portion may have a concave shape or a convex shape and display a projection image that may be expanded or contracted.

[Glass Plate of Laminated Glass]

In the specification, a glass plate on the visible side may be referred to as a first glass plate and a glass plate at a position farther from the visible side may be referred to as a second glass plate in the windshield glass.

As the glass plate, a glass plate which is generally used in the windshield glass can be used. For example, a glass plate, such as a green glass having high heat shielding properties, having a visible light transmittance of 80% or less such as 73% or 76% may be used. Even in a case where a glass plate having a low visible light transmittance is used, by using the half-mirror for displaying a projection image used in the embodiment of the invention, a windshield glass having the visible light transmittance of 70% or more can be prepared even in the projection image display portion.

In the laminated glass of the embodiment of the invention, it is preferable that the two glass plates have a curved surface, and it is particularly preferable that the surface on the half-mirror film side of the glass plate on the half-mirror film side is a concave curved surface. In addition, as shown in FIG. 3 which is one of the second embodiments of the laminated glass of the embodiment of the invention, it is preferable that the half-mirror film is closely in contact with the curved surface such that the heat seal layer is sandwiched therebetween.

The laminated glass of the embodiment of the invention is preferably used as a windshield glass.

The thickness of the glass plate is not particularly limited, and may be approximately 0.5 to 5.0 mm and is preferably 1.0 to 3.0 mm and more preferably 2.0 to 2.3 mm.

The materials or thicknesses of the first glass plate and the second glass plate may be the same or different from each other.

(Intermediate Film)

As an intermediate film, any known intermediate film used for a known laminated glass may be used. For example, a resin film including a resin selected from the group consisting of polyvinylbutyral (PVB), an ethylene-vinyl acetate copolymer, and a chlorine-containing resin can be used. The resin is preferably a main component of the intermediate film. The main component means a component occupying the intermediate film with the content 50% by mass or more.

Among the resins, polyvinylbutyral or an ethylene-vinyl acetate copolymer is preferable, and polyvinylbutyral is more preferable. The resin is preferably a synthesis resin.

Polyvinylbutyral can be obtained by acetalizing polyvinyl alcohol with butyraldehyde. A preferable lower limit of the degree of acetalizing of the polyvinylbutyral is 40%, a preferable upper limit thereof is 85%, a more preferable lower limit thereof is 60%, and a more preferable upper limit is 75%.

The polyvinyl alcohol is normally obtained by saponification of polyvinyl acetate, and polyvinyl alcohol having a degree of saponification of 80 to 99.8 mol % is generally used.

In addition, a preferable lower limit of the degree of polymerization of the polyvinyl alcohol is 200 and a preferable upper limit thereof is 3,000. In a case where the degree of polymerization of polyvinyl alcohol is 200 or more, the penetration resistance of the obtained laminated glass is unlikely to be lowered. In a case where the degree is 3,000 or less, the resin film has good moldability, and the stiffness of the resin film does not become too large. Thus, a good workability is achieved. A more preferable lower limit thereof is 500 and a more preferable upper limit is 2,000.

As a preferred aspect of the invention, the half-mirror film and the intermediate film are disposed so that all end portions of the transparent support and all end portions of selective reflection layer are located at least 5 mm inside end portions of the intermediate film, and thereafter, the two glass plates, the half-mirror film, and the intermediate film are closely in contact with one another while the transparent support being heated. The end portions are located inside the end portion of the intermediate film, the end portions are sealed with the intermediate film, and air is prevented from entering from a side surface. Therefore, no wrinkles are generated.

Preferably, all the end portions of the transparent support and all the end portions of the selective reflection layer are at least 10 mm inside from the end portion of the intermediate film, and particularly preferably at least 15 mm inside from the end portion of the intermediate film.

(Intermediate Film Including Half-Mirror Film)

The laminated intermediate film for the laminated glass including the half-mirror film can be formed by bonding the half-mirror film to a surface of the intermediate film. Alternatively, the laminated intermediate film for the laminated glass can also be formed by sandwiching the half-mirror film between the two intermediate films. The two intermediate films may be the same or different from each other, and the same intermediate films are preferable.

A well-known bonding method can be used for bonding the half-mirror film to the intermediate film, and laminate treatment is preferably used. In a case of performing the laminate treatment, it is preferable that the laminate treatment is performed under heated and pressurized conditions to some extent so that the laminate and the intermediate film are not peeled from each other after processing.

In order to stably perform the laminating, a film surface temperature of a side of the intermediate film to be bonded is preferably 50° C. to 130° C. and more preferably 70° C. to 100° C.

The pressurization is preferably performed at the time of laminating. The pressurization condition is preferably lower than 2.0 kg/cm$^2$ (less than 196 kPa), more preferably in a range of 0.5 to 1.8 kg/cm$^2$ (49 kPa to 176 kPa), and still more preferably 0.5 to 1.5 kg/cm$^2$ (49 kPa to 147 kPa).

[Layer on Visible Side with Respect to Selective Reflection Layer]

A problem regarding a double image (or a multiple image) occurs due to the superimposition of an image formed by reflected light from a layer reflecting the projected light and an image formed by the reflected light from the front surface or rear surface of the projection image display member, when seen from the light incidence side, in the projection image display member.

In the laminated glass of the embodiment of the invention, light transmitted through the selective reflection layer becomes a circularly polarized light having a sense opposite to the sense of the circularly polarized light reflected on the selective reflection layer or becomes the polarized light in a direction orthogonal to the direction of the linearly polarized light reflected on the selective reflection layer, and in a case where a layer closer to the rear surface side than the selective reflection layer has a low birefringence, the reflected light from the rear surface becomes mostly polarized light reflected on the selective reflection layer. Therefore, a significant double image is hardly generated. Particularly, by using polarized light as projected light, most of the projected light can be reflected on the selective reflection layer.

Meanwhile, the reflected light from the front surface may generate a significant double image. Particularly, in a case where the distance between the center of gravity of the selective reflection layer and a front surface when seen from the light incidence side of the laminated glass is a certain distance or more, there is a possibility that a double image is significantly generated. Specifically, in the laminated glass structure of the invention, there is a possibility that a double image is significantly generated in a case where the total thickness of the layer on which the first phase difference layer is disposed from the selective reflection layer (the thickness of the selective reflection layer is not included), that is, a distance from the visible side surface of the selective reflection layer to the visible side surface of the laminated glass (windshield glass) is 0.5 mm or more, more possibility that a double image is significantly generated in a case where the distance is 1 mm or more, even more possibility that a double image is significantly generated in a case where the distance is 1.5 mm or more, and particularly more possibility that a double image is significantly generated in a case where the distance is 2.0 mm or more. Examples of the layer closer to the visible side than the selective reflection layer include the transparent support, the intermediate film, and the second glass plate in addition to the first phase difference layer.

However, in the projection image display using p-polarized light described later, even in a case where the total thickness of the layers closer to the visible side than the selective reflection layer is as described above, the laminated glass of the embodiment of the invention allows a projection image to be visible without a significant double image.

<Head-Up Display System (Image Display System)>

The laminated glass of the embodiment of the invention can be used as a constituent member of a head-up display system (image display system). As an example, the laminated glass of the embodiment of the invention can be used as a windshield constituting a head-up display system in the vehicle and the like. The head-up display system preferably includes a projector.

Figure 7:
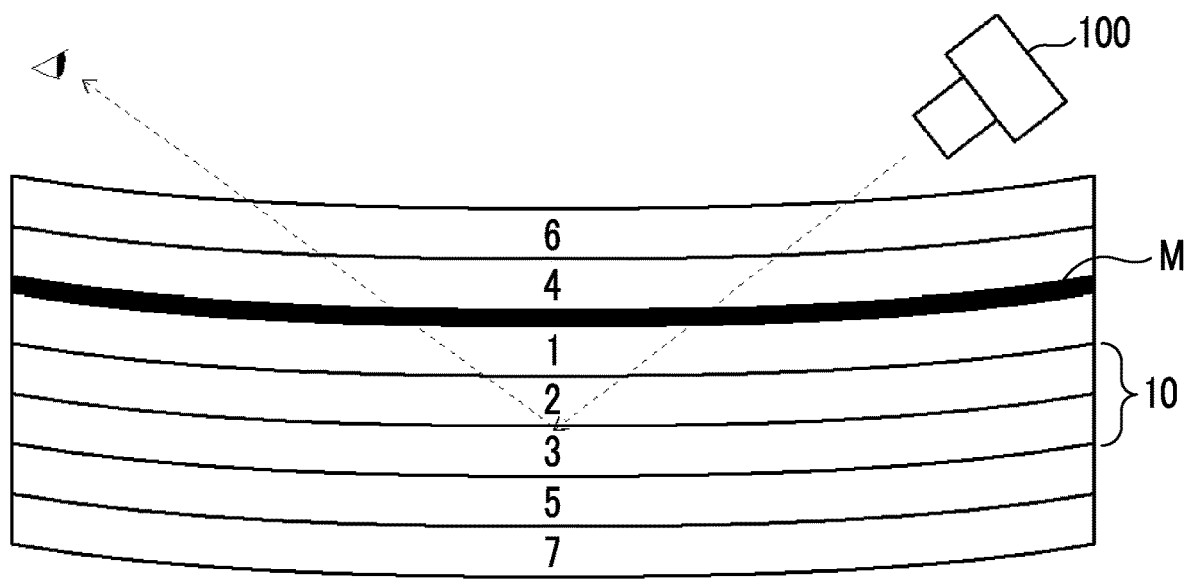
FIG. 7 is a diagram conceptually showing an observing state in a case where an image of the laminated glass for displaying a projection image shown in FIG. 2 is projected.

FIG. 7 conceptually shows an example of the head-up display system using the laminated glass of the embodiment of the invention as a windshield glass. The example shown in FIG. 7 is an example using the first aspect of the laminated glass of the embodiment of the invention shown in FIG. 2 as a laminated glass, the projector 100 projects an image from the first glass 6 side to the windshield glass (laminated glass), and the image is visible to a user from the first glass 6 side.

The example shown in FIG. 7 uses the first aspect of the laminated glass of the invention shown in FIG. 2 as a laminated glass, but even in a case of using the second aspect of the laminated glass of the invention shown in FIGS. 3 to 6, the head-up display system can be configured similarly. Even in a case of using the second aspect of the laminated glass of the invention shown in FIGS. 3 to 6, as an example, similarly, an image is projected from the first glass 6 side, and the image is visible from the first glass 6 side.

[Projector]

In the specification, the "projector" is an "apparatus which projects light or a screen image" and includes an "apparatus which projects a drawn image". In the head-up display system used in the invention, the projector may be disposed so that incident ray can be incident on the half-mirror for displaying a projection image of the windshield glass at an oblique angle of incidence. In the head-up display system, the projector includes a drawing device, and preferably performs a reflection display of a screen image (real image) drawn on a small-sized intermediate image screen as a virtual image, by a combiner.

(Drawing Device)

The drawing device may itself be a device displaying a screen image or a device emitting light capable of drawing a screen image. In the drawing device, light from the light source may be adjusted by a drawing method such as an optical modulator, laser luminance modulation means, light deflection means for drawing or the like. In the specification, the drawing device includes a light source, and means a device including an optical modulator, laser luminance modulation means, light deflection means for drawing or the like according to the drawing method.

(Light Source)

A light source is not particularly limited, and a Light Emitting Diode (LED), an organic light emitting diode (including an OLED), a discharge tube, a laser light source, and the like can be used. Among these, LEDs and a discharge tube are preferred. This is because the LEDs and the discharge tube are suitable for a light source of a drawing device that emits linearly polarized light. Among these, LEDs are particularly preferable.

As the emission wavelength is not continuous in the visible light region, LEDs are suitable for combination with a combiner in which a cholesteric liquid crystal layer exhibiting selective reflection in a specific wavelength region is used as described later.

(Drawing Method)

The drawing method can be selected according to the used light source and usage, and is not particularly limited.

Examples of the drawing method include a fluorescent display tube, a liquid crystal display (LCD) method using a liquid crystal, a liquid crystal on silicon (LCOS) method, digital light processing (DLP) method, a scanning method using a laser and the like. The drawing method may be a method using a fluorescent display tube integrated with a light source. The drawing method is preferably an LCD.

In the LCD method and the LCOS method, light beams having respective colors are modulated and multiplexed by the optical modulator, and a light beam is emitted from a projection lens.

The DLP method is a display system using a digital micromirror device (DMD), in which micromirrors corresponding to the number of pixels are arranged, the drawing is performed and light is emitted from the projection lens.

The scanning method is a method of scanning a screen with light rays and imaging using an afterimage in eyes. For example, the description of JP1995-270711A (JP-H7-270711A), JP2013-228674A, and the like can also be referred to. In the scanning method using the laser, a luminance modulated laser beam having respective colors (for example, red light, green light, and blue light) may be bundled into one light beam by a multiplexing optical system or a condenser lens, the scanning may be performed with the light beam by the light deflection means, and the light beam may be drawn on an intermediate image screen to be described later.

In the scanning method, the luminance modulation of a laser beam having respective colors (for example, red light, green light, and blue light) may be performed directly by changing an intensity of the light source, or may be performed by an external modulator.

The light deflection means includes a galvanometer mirror, a combination of a galvanometer mirror and a polygon mirror, or a micro electro mechanical systems (MEMS), and the MEMS is preferable. The scanning method includes a random scan method, a raster scan method, or the like, and it is preferable to use a raster scan method. In the raster scan method, the laser beam can be driven, for example, with a resonance frequency in a horizontal direction and with a saw-tooth wave in a vertical direction. Since the scanning method does not require the projection lens, it is easy to miniaturize the device.

Light emitted from the drawing device may be linearly polarized light or natural light (non-polarized light).

Light emitted from the drawing device included in the head-up display system used in the invention is preferably linearly polarized light. In a drawing device using a drawing method of the LCD or the LCOS and a drawing device using a laser light source, light emitted from the drawing device is essentially linearly polarized light. In the case where a drawing device in which the emitted light is linearly polarized light and includes light beams having a plurality of wavelengths (colors), the polarization directions (transmission axis directions) of polarized light in a plurality of light beams are preferably the same or orthogonal to each other. It is known that commercially available drawing devices have non-uniform polarization directions in wavelength regions of red light, green light, and blue light included in the emitted light (refer to JP2000-221449A). Specifically, an example is known that the polarization direction of the green light is orthogonal to the polarization direction of the red light and the polarization direction of the blue light.

(Intermediate Image Screen)

As described above, the drawing device may use an intermediate image screen. In the specification, the "intermediate image screen" is a screen on which a screen image is drawn. That is, in a case where light emitted from the drawing device is not yet visible as a screen image, the drawing device forms a screen image visible on the intermediate image screen using the light.

The screen image drawn on the intermediate image screen may be projected on the combiner by light transmitted through the intermediate image screen, and may be reflected on the intermediate image screen and then projected on the combiner.

Examples of the intermediate image screen include a scattering film, a microlens array, a screen for rear projection, and the like. In a case where a plastic material is used as the intermediate image screen, assuming that the intermediate image screen has birefringence, a polarization plane and a light intensity of the polarized light incident on the intermediate image screen are in disorder, and as a result, color unevenness or the like is likely to occur in the combiner. However, by using a phase difference layer having a predetermined phase difference, the problem of generating color unevenness can be reduced.

It is preferable that the intermediate image screen has a function of spreading and transmitting an incident ray. This is because an enlarged projection image can be displayed. An example of the intermediate image screen includes a screen composed of a microlens array. The microarray lens used in the head-up display is described in, for example, JP2012-226303A, JP2010-145745A, JP2007-523369A, and the like.

The projector may include a reflecting mirror which adjusts an optical path of projected light formed by the drawing device.

As the head-up display system using the windshield glass as the projection image display member, descriptions disclosed in JP1990-141720A (JP-H02-141720A), JP1998-096874A (JP-H10-096874A), JP2003-98470A, U.S. Pat. No. 5,013,134A, and JP2006-512622A can be referred to.

The laminated glass of the embodiment of the invention is particularly effective for a windshield glass constituting a head-up display system used in combination with a projector using a laser, an LED, an OLED, and the like in which an emission wavelength is not continuous in a visible light region as a light source. This is because, the selective reflection center wavelength of the cholesteric liquid crystal layer can be adjusted in accordance with each emission wavelength. In addition, the windshield glass can also be used for projection of a display such as a liquid crystal display device (LCD) in which display light is polarized.

[Projected Light (Incident Ray)]

The image display system of the embodiment of the invention in which the viewer can visually recognize the reflected image is obtained by projecting an image from the p linearly polarized light source on the laminated glass of the embodiment of the invention. For example, in a case where the head-up display system is constituted using the laminated glass of the invention as a windshield glass, the image display system of the embodiment of the invention in which the viewer can visually recognize a reflected image is obtained by projecting an image from the p linearly polarized light source on the windshield glass.

A direction in which p linearly polarized light is incident is a direction in which the half-mirror film incorporated in the laminated glass functions as a reflective polarizer of the linearly polarized light, and in a case where the half-mirror film has the selective reflection layer and the phase difference layer, the light source is arranged so that p linearly polarized light is incident from the phase difference layer side.

The incident ray is preferably incident at an oblique angle of incidence of 45° to 70° with respect to the normal line of the half-mirror for displaying a projection image. A Brewster's angle at an interface between the glass having a refractive index of approximately 1.51 and the air having a refractive index of 1 is approximately 56°. The p-polarized light is allowed to incident in the range of the angle, and thereby the amount of the reflected light which is reflected from the surface of the windshield glass on the visible side with respect to the selective reflection layer and from which the incident ray for the projection image display is reflected is small. Therefore, it is possible to perform an image display with a decreased effect of a double image. The angle is also preferably set as 50° to 65°. At this time, an observation of the projection image can be performed at an angle of 45° to 70°, preferably 50° to 65° on a side opposite to a side on which light is incident, with respect to the normal line of the selective reflection layer in the incidence side of projected light, is preferable.

In a case where the laminated glass of the embodiment of the invention is used for the windshield glass, the incident ray may be incident in any direction of upwards, downwards, rightwards, and leftwards of the windshield glass, and may be determined in accordance with a visible direction. For example, the incident lay is preferably incident at the oblique incidence angle from the downward direction at the time of use.

Furthermore, the slow axis of the phase difference layer in the windshield glass preferably forms an angle of 30° to 85° or 120° to 175° with respect to the vibration direction of the incident p-polarized light (incident surface of incident ray) according to the in-plane phase difference of the phase difference layer.

As described above, the projected light during the projection image display in the head-up display (the image display system of the embodiment of the invention) is preferably p-polarized light vibrating in the direction parallel to the incident surface. In a case where the light emitted from the projector is not a linearly polarized light, the projected light may be set as p-polarized light by using a linearly polarizing film disposed on the side of the emitted light of the projector, or the light may be set as p-polarized light on an optical path between the projector and the windshield glass. As described above, in a projector whose polarization direction is not uniform in the wavelength regions of red light, green light, and blue light of the emitted light, the polarization direction is preferably adjusted in a wavelength selective manner, and p-polarized light is incident in all color wavelength regions.

The head-up display system may be a projection system in which the virtual image forming position is variable. Such a projection system is described in, for example, JP2009-150947A. The virtual image forming position is variable so that the driver can visually confirm the virtual image more comfortably and conveniently. The virtual image forming position is a position at which the driver of the vehicle can visually confirm a virtual image, and for example, a position located 1,000 mm or more away from the front of the windshield glass as seen from a normal driver.

Here, in a case where the glass is non-uniform (wedge-shaped) at the projection image display portion as the glass described in the above-mentioned JP2011-505330A, assuming that the virtual image forming position is changed, it is necessary to change the angle of the wedge-shaped. Therefore, for example, as the described in JP2017-015902A, it is necessary to respond artificially to the change of the virtual image forming position by partially changing the angle of the wedge shape to change the projection position.

In the head-up display system using the laminated glass of the invention as the windshield glass and constructed by using p-polarized light as described above, it is unnecessary to use a wedge-shaped glass, and the thickness of the glass is uniform at the projection image display portion. Therefore, it is possible to suitably adopt a projection system in which the virtual image forming position is variable.

EXAMPLES

Hereinafter, the invention will be described more specifically with reference to the examples and the reference examples. Materials, reagents, amounts of substances and percentages thereof, and operations shown in the following examples, comparative examples, and production examples can be suitably changed within a range not departing from the gist of the invention. Therefore, the ranges of the invention are not limited to the following examples and the reference examples.

<Preparation of Coating Solution>

(Coating Solution for Forming Cholesteric Liquid Crystal Layer)

The following components were mixed to prepare coating solutions B, G, and R for forming a cholesteric liquid crystal layer having the following composition.

| Composition of coating solution B | |
|---|---|
| Compound 1 | 80 parts by mass |
| Compound 2 | 20 parts by mass |
| Fluorine compound 1 | 0.02 parts by mass |
| Fluorine compound 3 | 0.01 parts by mass |
| Right-turning chiral agent LC756 (manufactured by BASF Corporation) | Adjust according to a target reflection wavelength |
| Polymerization initiator IRGACURE OXE 01 (manufactured by BASF Corporation) | 0.75 parts by mass |
| Solvent (methyl acetate) | an amount of the solute concentration to be 20% by mass |

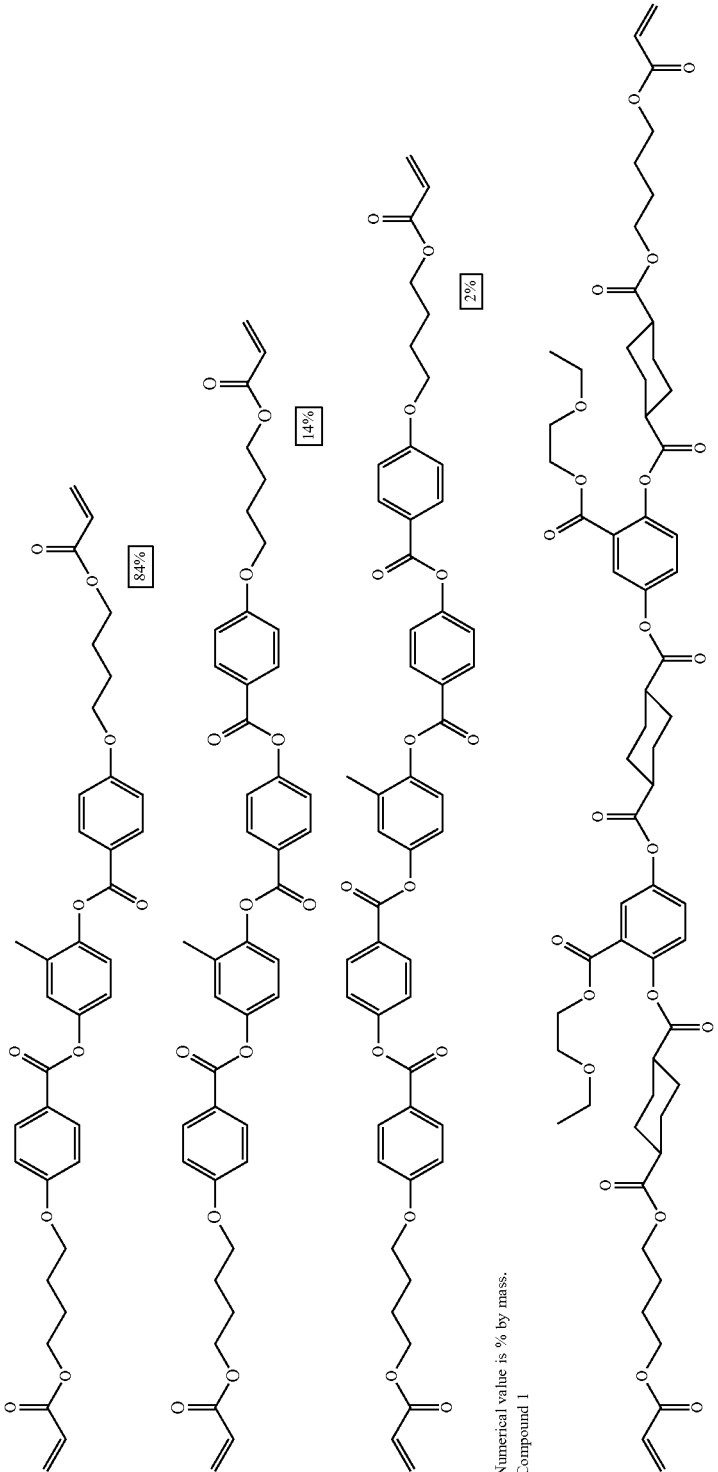

-continued
Composition of coating solutions G and R
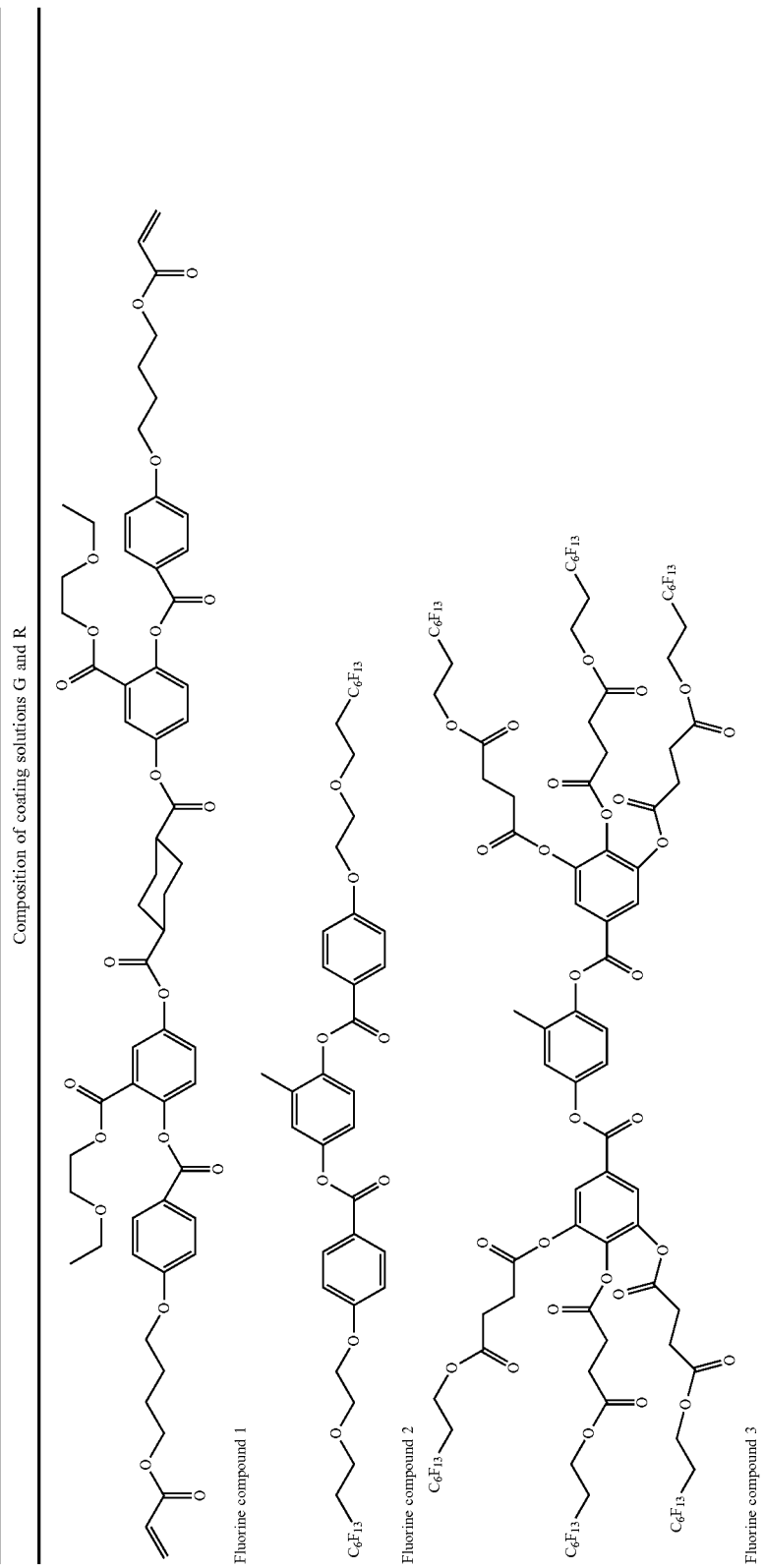
Fluorine compound 1
Fluorine compound 2
Fluorine compound 3

-continued
Composition of coating solutions G and R
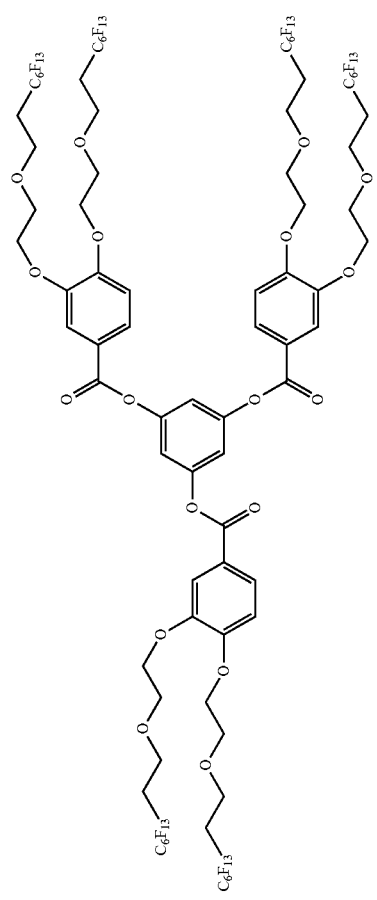

The coating solutions B, G, and R were prepared by adjusting a prescribed amount of the chiral agent LC-756 having the coating solution composition described above. Using each coating solution, a single cholesteric liquid crystal layer was prepared on a peelable support in the same manner as in the preparation of the following functional layers, and the reflection properties were confirmed. As a result, all the prepared cholesteric liquid crystal layers were right-handed circularly polarized light reflection layers, and a central reflection wavelength was as shown in Table 1 below.

TABLE 1

| Coating solution | Central reflection wavelength |
|---|---|
| Coating solution B | 515 nm |
| Coating solution G | 685 nm |
| Coating solution R | 775 nm |

(Coating Solution for Forming Phase Difference Layer)

The following components were mixed to prepare a coating solution for forming a phase difference layer having the following composition.

| Composition of coating solution for forming phase difference layer | |
|---|---|
| Mixture 1 | 100 parts by mass |
| Fluorine compound 1 | 0.05 parts by mass |
| Fluorine compound 2 | 0.01 parts by mass |
| Polymerization initiator IRGACURE OXE 01 (manufactured by BASF Corporation) 0.75 parts by mass Solvent (methyl ethyl ketone) | an amount of the solute concentration to be 25% by mass |

<Saponification of Cellulose Acylate Film>

A cellulose acylate film of 40 μm obtained by the same preparation method as in Example 20 of WO2014/112575A was passed through a dielectric heating roll at a temperature of 60° C., and the film surface temperature was increased to 40° C. Thereafter, an alkali solution having the following composition was applied to one side of the film using a bar coater at a coating amount of 14 mL/m² and allowed to stay for 10 seconds under a steam far-infrared heater (manufactured by Noritake Co., Limited) heated to 110° C.

Next, 3 mL/m² of pure water was applied using the same bar coater.

Next, washing with a fountain coater and draining with an air knife were repeated three times, and then a cellulose acylate film 1 is prepared by staying in a drying zone at 70° C. for 5 seconds, drying, and performing saponification treatment.

The in-plane phase difference of the cellulose acylate film 1 was measured by AxoScan and was 1 nm.

| Composition of alkali solution | |
|---|---|
| Potassium hydroxide | 4.7 parts by mass |
| Water | 15.7 parts by mass |
| Isopropanol | 64.8 parts by mass |
| Surfactant (C$_{16}$H$_{33}$O(CH$_2$CH$_2$O)10H) | 1.0 part by mass |
| Propylene glycol | 14.9 parts by mass |

<Formation of Orientation Film>

A coating solution for forming an orientation film having the composition shown below was applied on a saponified surface of the saponified cellulose acylate film 1 (transparent support) obtained above using a wire bar coater at 24 mL/m² and dried with warm air at 100° C. for 120 seconds.

| Composition of coating solution for forming orientation film | |
|---|---|
| Modified polyvinyl alcohol shown below | 28 parts by mass |
| Citrate ester (AS3, Sankyo Chemical Co., Ltd.) | 1.2 parts by mass |
| Photopolymerization initiator (Irgacure 2959, manufactured by BASF Corporation) | 0.84 parts by mass |
| Glutaraldehyde | 2.8 parts by mass |
| Water | 699 parts by mass |
| Methanol | 226 parts by mass |

(Modified Polyvinyl Alcohol)

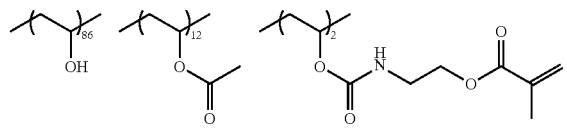

<Preparation of Cholesteric Liquid Crystal Layer Laminate>

A rubbing treatment (rayon cloth, pressure: 0.1 kgf (0.98 N), rotation speed: 1,000 rpm, conveyance rate: 10 m/min, and the number of times: 1 reciprocation) is performed on the above prepared orientation film in a direction rotated 31.5° counterclockwise with respect to a short side direction.

A coating solution for forming a phase difference layer was applied to the rubbed surface of the cellulose acylate film 1 using a wire bar, dried, heated at 55° C. for 1 minute, placed on a hot plate at 50° C., and irradiated with ultraviolet ray for 6 seconds using an electrodeless lamp "D bulb" (60 mW/cm²) manufactured by Fusion UV Systems Inc., and then a liquid crystal phase was immobilized to obtain a phase difference layer having a thickness of 1.9 μm. In this case, retardation of the phase difference layer and an angle of a slow axis were measured using AxoScan, and as a result, the retardation was 349 nm and the slow axis angle was +58.5° with respect to an upper vertical direction (short side direction) of the completed laminated glass.

A coating solution B was applied to a surface of the obtained phase difference layer using the wire bar, dried, heated at 85° C. for 1 minute, placed on the hot plate at 80° C., and irradiated with ultraviolet ray for 6 seconds using an electrodeless lamp "D bulb" (60 mW/cm²) manufactured by Heraeus, and then a cholesteric liquid crystalline phase was immobilized to obtain a cholesteric liquid crystal layer having a thickness of 2.3 μm.

A coating solution G was further applied to a surface of the obtained cholesteric liquid crystal layer using the wire bar, dried, heated at 70° C. for 1 minute, placed on the hot plate at 75° C., and irradiated with ultraviolet ray for 6 seconds using an electrodeless lamp "D bulb" (60 mW/cm$^2$) manufactured by Heraeus, and then a cholesteric liquid crystalline phase was immobilized to obtain a cholesteric liquid crystal layer having a thickness of 0.7 μm.

The in-plane phase difference at 550 nm of the PET film was measured by AxoScan, and the measured in-plane phase difference was more than 1,000 nm.

<Preparation 1 of Heat Seal Layer>
(Coating Solution 1 for Forming Heat Seal Layer)
The following components were mixed to prepare the coating solutions 1 to 18 for forming a heat seal layer having composition shown in Table 2 below.

TABLE 2

| | Composition | Coating solution 1 | Coating solution 2 | Coating solution 3 | Coating solution 4 | Coating solution 5 | Coating solution 6 | Coating solution 7 | Coating solution 8 | Coating solution 9 |
|---|---|---|---|---|---|---|---|---|---|---|
| Heat seal resin | Piece of PVB sheet (manufactured by Sekisui Chemical Co., Ltd.) | 5 | 5 | 5 | 5 | 5 | 5 | 4.9 | 4.75 | 3.75 |
| Inorganic particles | AEROSIL RX 300 (manufactured by Nippon Aerosil Co., Ltd.) dispersion liquid | | | | | | | 2 | 5 | 25 |
| | MEK-ST L (manufactured by Nissan Chemical Co., Ltd.) | | | | | | | | | |
| Solvent | Methanol  Non- permeable solvent | 90.25 | 67.69 | 63.18 | 45.13 | 27.08 | 22.56 | 43.23 | 40.38 | 21.38 |
| | 1-Butanol  Non- permeable solvent | 4.75 | 3.56 | 3.33 | 2.38 | 1.43 | 1.19 | 2.38 | 2.38 | 2.38 |
| | Methylacetate  Permeable solvent | | 23.75 | 28.5 | 47.5 | 66.5 | 71.25 | 47.5 | 47.5 | 47.5 |
| | Water  Non- permeable solvent | | | | | | | | | |
| | Permeable solvent Ratio | 0 | 25 | 30 | 50 | 70 | 75 | 50 | 50 | 50 |

| | Composition | Coating solution 10 | Coating solution 11 | Coating solution 12 | Coating solution 13 | Coating solution 14 | Coating solution 15 | Coating solution 16 | Coating solution 17 | Coating solution 18 |
|---|---|---|---|---|---|---|---|---|---|---|
| Heat seal resin | Piece of PVB sheet (manufactured by Sekisui Chemical Co., Ltd.) | 3.25 | 4.9 | 4.75 | 3.75 | 3.25 | 4.94 | 4.88 | 4.76 | 4.55 |
| Inorganic particles | AEROSIL RX 300 (manufactured by Nippon Aerosil Co., Ltd.) dispersion liquid | 35 | | | | | | | | |
| | MEK-ST L (manufactured by Nissan Chemical Co., Ltd.) | | 0.33 | 0.83 | 4.17 | 5.83 | | | | |
| Solvent | Methanol  Non- permeable solvent | 11.88 | 44.89 | 44.54 | 42.21 | 41.04 | 44.57 | 44.02 | 42.98 | 41.02 |
| | 1-Butanol  Non- permeable solvent | 2.38 | 2.38 | 2.38 | 2.38 | 2.38 | 2.35 | 2.32 | 2.26 | 2.16 |
| | Methylacetate  Permeable solvent | 47.5 | 47.5 | 47.5 | 47.5 | 47.5 | 46.91 | 46.34 | 45.24 | 43.18 |
| | Water  Non- permeable solvent | | | | | | 1.23 | 2.44 | 4.76 | 9.09 |
| | Permeable solvent Ratio | 50 | 50 | 50 | 50 | 50 | 50 | 50 | 50 | 50 |

A coating solution R was further applied to a surface of the obtained cholesteric liquid crystal layer using the wire bar, dried, heated at 70° C. for 1 minute, placed on the hot plate at 75° C., and irradiated with ultraviolet ray for 6 seconds using an electrodeless lamp "D bulb" (60 mW/cm$^2$) manufactured by Heraeus, and then a cholesteric liquid crystalline phase was immobilized to obtain a cholesteric liquid crystal layer having a thickness of 2.8 μm.

Thus, a cholesteric liquid crystal layer laminate A (half-mirror film) which has a functional layer consisting of the phase difference layer and three cholesteric liquid crystal layers was obtained. The transmission spectrum of the laminate A was measured using a spectrophotometer (manufactured by JASCO Corporation, V-670), and as a result, transmission spectra having selective reflection center wavelengths at 515 nm, 685 nm, and 775 nm were obtained.

A cholesteric liquid crystal layer laminate B was prepared in the same manner except that a PET film (Cosmo Shine A4100, thickness: 100 μm) manufactured by Toyobo Co., Ltd. was used as the transparent support. The PET film used as the transparent support has an undercoat layer on one surface, and the other surface does not have an undercoat layer and is subjected to rubbing treatment. The phase difference layer and the cholesteric liquid crystal layer were laminated on the rubbing-treated surface of the PET film to obtain the cholesteric liquid crystal layer laminate B.

<Preparation of Silica Particle Dispersion>
In the invention, AEROSIL RX 300 (manufactured by Nippon Aerosil Co., Ltd.) as inorganic fine particles preferably used for the heat seal layer was added to MiBK (methyl isobutyl ketone) so as to have a solid content concentration of 5% by mass and stirred for 30 minutes using a magnetic stirrer. Thereafter, ultrasonic dispersion was performed for 10 minutes using an ultrasonic disperser (Ultrasonic Homogenizer UH-600S, manufactured by SMT Co., Ltd.) to prepare a silica particle dispersion.

A part of the obtained dispersion liquid was collected for measuring the average secondary particle diameter, and the average secondary particle diameter of the silica particles in the dispersion was measured using Microtrac MT3000 (manufactured by MicrotracBEL Corp.), and as a result, the average secondary particle diameter was 190 nm.

As MEK-ST L (manufactured by Nissan Chemical Co., Ltd.), a commercially available MEK dispersion liquid was used (solid content concentration 30% by mass).

In the table, as an addition amount of inorganic fine particles, an addition amount of dispersion liquid is described.

<Preparation 1 of Heat Seal Laminate>
Coating solutions 1 to 18 for forming a heat seal layer were applied to a rear surface of the cholesteric liquid crystal layer laminate A (the surface side not coated with cholesteric liquid crystal) using the wire bar, and then dried and heated at 50° C. for 1 minute to obtain heat seal layers 1 to 18 having a thickness of 0.5 µm. In this way, heat seal laminates Ah1 to 18 having the phase difference layer and three cholesteric liquid crystal layers (selective reflection layers) on one surface of the transparent support and heat seal layers 1 to 18 on the other surface of the transparent support were obtained.

The coating solution 4 for forming a heat seal layer was applied to a rear surface of the cholesteric liquid crystal layer laminate B (the surface side which is not coated with cholesteric liquid crystal and has an undercoat layer of the PET film) using the wire bar, dried, and heated at 50° C. for 1 minute to obtain the heat seal layer 18 having a thickness of 0.5 µm. In this way, a heat seal laminate Ah19 which has a functional layer consisting of the phase difference layer and three cholesteric liquid crystal layers on the surface and the heat seal layer 18 on the rear surface was obtained.

<Preparation of Laminated Glass>

The heat seal laminates Ah1 to 19 having a length of 220 mm×a width of 290 mm were disposed on a center of an upwardly convex curved glass plate having a length of 260 mm×a width of 330 mm and a thickness of 2 mm such that the heat seal layer side faces down. Thereby, a laminate is formed to have the first glass plate, the heat seal layer, the transparent support, the phase difference layer, and the selective reflection layer (cholesteric liquid crystal layer) in this order.

A PVB film (intermediate film) having a length of 260 mm×a width of 330 mm and a thickness of 0.38 mm manufactured by Sekisui Chemical Co., Ltd. is disposed on the laminate, and the upwardly convex curved glass plate (second glass plate) having a length of 260 mm×a width of 330 mm and a thickness of 2 mm was further disposed thereon. The laminate was held at 90° C. and 10 kPa (0.1 atm) for 1 hour and heated in an autoclave (manufactured by Kurihara Seisakusho, K.K.) at 140° C. and 1.3 Mpa (13 atm) for 20 minutes to remove bubbles, and then laminated glasses A to S were obtained. The laminated glasses A to S have the same layer constitution as the laminated glass shown in FIG. 2.

(Measurement of Storage Elastic Modulus)

After humidity conditioning samples of 5 mm×30 mm of the cellulose acylate film 1 used as the transparent support and the PET film manufactured by Toyobo Co., Ltd. (Cosmo Shine A4100, thickness: 100 µm) and used as the transparent support at 25° C. and 60% of relative humidity for 2 hours or longer, the storage elastic modulus was measured using a dynamic viscoelasticity measurement device (manufactured by IT measurement control company, Vibron: DVA-225) at the distance between grips of 20 mm, the heating rate of 2° C./min, the measuring temperature range of 30° C. to 220° C., and the frequency 1 Hz, and a value of the storage elastic modulus at the set temperature of each autoclave was read.

(Evaluation of Presence or Absence of Mixed Layer Between Heat Seal Layer and Transparent Support)

Regarding presence or absence of the mixed layer between the heat seal layer of the heat seal laminate and the transparent support, the cross section of the heat seal laminate was observed with an SEM, it is evaluated whether or not there is a mixed layer, and the evaluation is described as presence or absence of the mixed layer in the Table.

(Evaluation of Adhesiveness Between Heat Seal Layer and Transparent Support)

Regarding the adhesiveness between the heat seal layer of the heat seal laminate and the transparent support, a cross-cut test defined in JISK5600-5-6 was conducted, and the peelability from the transparent support when conducting test was evaluated according to the following criteria.

As an area where the heat seal layer is peeled is small, the peeled heat seal layer decreases during a laminated glass preparing operation, and the generation of fine wrinkles can be suppressed. In addition, as a portion where the heat seal layer is peeled is decreased, the strength of the laminated glass is increased so as to withstand the impact test.

A: The area where the heat seal layer is peeled off is 20% or less.

B: The area where the heat seal layer is peeled off is more than 20% and 60% or less.

C: The area where the heat seal layer is peeled off is more than 60%.

(Evaluation of Sticking Properties of Heat Seal Layer with Respect to Glass (Stickiness))

Regarding each laminate, sticking properties in a case of bonding a surface reversing to the surface to which the liquid crystal layer is applied and the glass was evaluated according to the following criteria. As stickiness disappears, the sliding properties are improved, and therefore, handleability of the laminate during laminated glass processing is improved. As a result, wrinkles are less likely to be generated.

A: There is no stickiness at all.

B: There is almost no stickiness.

C: Stickiness is strong.

(Evaluation of Wrinkles)

After the laminated glass processing, whether or not fine wrinkle unevenness is generated in the laminate was visually evaluated according to the following criteria.

A: There is no generation of fine wrinkles at all.

B: Although there are no fine wrinkles, a slight lenticulation is visible.

C: Fine wrinkles are generated.

(Evaluation of Image Visibility)

The concave surface of the laminated glass is irradiated with p-polarized light as shown in FIG. 7, an image is projected, and then distortion of a generated virtual image and presence or absence of color unevenness are regarded as the image visibility. Thereby, image visibility was evaluated according to the following criteria.

A: There are no distortion and color unevenness.

C: There are distortion and color unevenness.

(Evaluation of Haze of Laminated Glass)

With respect to a haze of each laminated glass, the haze of each laminated glass was measured by using a haze meter (manufactured by Nippon Denshoku Industries Co., Ltd., Haze meter NDH 2000). The evaluation results are based on the following criteria.

A: 0.5 or less

B: 0.5 or more and 1.0 or less

C: 1.0 or more

TABLE 3

| Laminated glass No. | Laminate No. | Autoclave temperature [° C.] | Storage elastic modulus at autoclave temperature [GPa] | Re [nm] | Heat seal laminate Mixed layer Presence/ Absence | Adhe- siveness | Stick- iness | Laminated glass Wrinkles | Projected image visibility | Haze |
|---|---|---|---|---|---|---|---|---|---|---|
| Reference Example 1 | Laminated glass C | Heat seal laminate Ah3 | 140 | 1.02 | 1 | Presence | A | C | B | A | A |
| Reference Example 2 | Laminated glass D | Heat seal laminate Ah4 | 140 | 1.02 | 1 | Presence | A | C | B | A | A |
| Reference Example 3 | Laminated glass E | Heat seal laminate Ah5 | 140 | 1.02 | 1 | Presence | A | C | B | A | A |
| Example 4 | Laminated glass G | Heat seal laminate Ah7 | 140 | 1.02 | 1 | Presence | A | B | B | A | A |
| Example 5 | Laminated glass H | Heat seal laminate Ah8 | 140 | 1.02 | 1 | Presence | A | A | A | A | A |
| Example 6 | Laminated glass I | Heat seal laminate Ah9 | 140 | 1.02 | 1 | Presence | A | A | A | A | A |
| Example 7 | Laminated glass K | Heat seal laminate Ah11 | 140 | 1.02 | 1 | Presence | A | B | B | A | A |
| Example 8 | Laminated glass L | Heat seal laminate Ah12 | 140 | 1.02 | 1 | Presence | A | A | A | A | A |
| Example 9 | Laminated glass M | Heat seal laminate Ah13 | 140 | 1.02 | 1 | Presence | A | A | A | A | A |
| Example 10 | Laminated glass O | Heat seal laminate Ah15 | 140 | 1.02 | 1 | Presence | A | B | B | A | A |
| Example 11 | Laminated glass P | Heat seal laminate Ah16 | 140 | 1.02 | 1 | Presence | A | A | A | A | A |
| Example 12 | Laminated glass Q | Heat seal laminate Ah17 | 140 | 1.02 | 1 | Presence | A | A | A | A | A |
| Reference Example 13 | Laminated glass A | Heat seal laminate Ah1 | 140 | 1.02 | 1 | Absence | C | C | C | A | A |
| Reference Example 14 | Laminated glass B | Heat seal laminate Ah2 | 140 | 1.02 | 1 | Absence | B | C | C | A | A |
| Reference Example 19 | Laminated glass S | Heat seal laminate Ah19 | 140 | 0.814 | >1,000 | Absence | A | C | C | C | A |

In the table, Re [nm] is the in-plane phase difference of the cellulose acylate film which is transparent support and the PET film.

Laminated glasses C to E, G to I, K to M, and O to Q could be subjected to the laminate processing without causing fine wrinkle unevenness in the laminate, and had excellent external light reflection and image visibility. In particular, since laminated glasses H, I, L, M, P, and Q had excellent sticking properties with respect to the glass of the heat seal layer, handleability during the laminated glass processing was improved. Therefore, wrinkles were further decreased.

In the laminated glasses A and B, the adhesiveness between the heat seal layer and the cellulose acylate film was poor, and fine wrinkle unevenness was generated. Since retardation of the PET film (manufactured by Toyobo Co., Ltd., Cosmo Shine A4100, thickness: 100 μm) used as the transparent support is large, the laminated glass S had a problem that a rainbow-like colored pattern appears in the reflection of external light. Furthermore, since the p-polarized light of the projection image was disturbed and light cannot be efficiently reflected on the cholesteric liquid crystal layer, color of the visible virtual image changes and brightness of the image was decreased.

The laminated glass S (Reference Example 19) does not have a mixed layer, but uses the PET film having the undercoat layer as the transparent support and forms the heat seal layer on a surface having the undercoat layer. Therefore, even though the laminated glass S does not have the mixed layer, high adhesiveness is obtained between the undercoat layer and the heat seal layer.

<Preparation 2 of Cholesteric Liquid Crystal Layer Laminate>

A rubbing treatment (rayon cloth, pressure: 0.1 kgf (0.98 N), rotation speed: 1,000 rpm, conveyance rate: 10 m/min, and the number of times: 1 reciprocation) is performed on an orientation film prepared on a cellulose acylate film 1 in the direction rotated 31.5° counterclockwise with respect to a short side direction.

A coating solution for forming a phase difference layer was applied to the rubbed surface using the wire bar, dried, heated at 55° C. for 1 minute, placed on a hot plate at 50° C., and irradiated with ultraviolet ray for 6 seconds using an electrodeless lamp "D bulb" (60 mW/cm$^2$) manufactured by Fusion UV Systems Inc., and then a liquid crystal phase was immobilized to obtain a phase difference layer having the thickness of 1.9 μm. In this case, retardation of the phase difference layer and an angle of a slow axis were measured using AxoScan (manufactured by Axometrics, Inc), and as a result, the retardation was 349 nm and the slow axis angle was +58.5° with respect to an upper vertical direction (short side direction) of the completed laminated glass.

A coating solution B was applied to a surface of the obtained phase difference layer using the wire bar, dried, heated at 85° C. for 1 minute, placed on the hot plate at 80° C., and irradiated with ultraviolet ray for 6 seconds using an electrodeless lamp "D bulb" (60 mW/cm$^2$) manufactured by Heraeus, and then a cholesteric liquid crystalline phase was immobilized to obtain a cholesteric liquid crystal layer having a thickness of 2.3 μm.

A coating solution G was further applied to a surface of the obtained cholesteric liquid crystal layer using the wire bar, dried, heated at 70° C. for 1 minute, placed on the hot plate at 75° C., and irradiated with ultraviolet ray for 6 seconds using an electrodeless lamp "D bulb" (60 mW/cm$^2$) manufactured by Heraeus, and then a cholesteric liquid crystalline phase was immobilized to obtain a cholesteric liquid crystal layer having a thickness of 0.7 µm.

A coating solution R was further applied to a surface of the obtained cholesteric liquid crystal layer using the wire bar, dried, heated at 70° C. for 1 minute, placed on the hot plate at 75° C., and irradiated with ultraviolet ray for 1 second using an electrodeless lamp "D bulb" (60 mW/cm$^2$) manufactured by Heraeus, and then a cholesteric liquid crystalline phase was immobilized to obtain a cholesteric liquid crystal layer having a thickness of 2.8 µm.

Thus, a cholesteric liquid crystal layer laminate C (half-mirror film) which has the phase difference layer and the three cholesteric liquid crystal layers (selective reflection layer) was obtained.

The transmission spectrum of the laminate C was measured using a spectrophotometer (manufactured by JASCO Corporation, V-670), and as a result, transmission spectra having selective reflection center wavelengths at 515 nm, 685 nm, and 775 nm were obtained.

<Preparation 1 of Heat Seal Layer>
(Coating Solution 1 for Forming Heat Seal Layer)

The following components were mixed to prepare the coating solutions 19 and 20 for forming a heat seal layer having composition shown in Table 4 below.

TABLE 4

| | Composition | Coating solution 19 | Coating solution 20 |
|---|---|---|---|
| Heat seal resin | Piece of PVB sheet (manufactured by Sekisui Chemical Co., Ltd.) | 4.75 | 4.7025 |
| Inorganic particles | AEROSIL RX 300 (manufactured by Nippon Aerosil Co., Ltd.) dispersion liquid | 5 | 5 |
| Adhesiveness enhancer | U6HA (manufactured by Shin-Nakamura Chemical Co., Ltd.) | — | 0.0475 |
| Polymerization initiator | IRGACURE OXE 01 (manufactured by BASF Corporation) | — | 0.000475 |
| Solvent | Methanol | 85.5 | 85.5 |
| | 1-Butanol | 4.75 | 4.75 |

<Preparation 2 of Heat Seal Laminate>

Coating solutions for forming the heat seal layer 8 and 19 were applied to a surface of the cholesteric liquid crystal layer laminate A, on which the cholesteric liquid crystal layer is not formed, using the wire bar, and then dried and heated at 120° C. for 5 minutes to obtain a heat seal layer having a thickness of 0.5 µm. In this way, heat seal laminates Bh1 and 2 having the phase difference layer and three cholesteric liquid crystal layers (selective reflection layers) on one surface of the transparent support and the heat seal layer on the other surface of the transparent support were obtained.

The coating solution for forming the heat seal layer 19 was applied to the cholesteric liquid crystal layer of the cholesteric liquid crystal layer laminate C using the wire bar, and then dried and heated at 120° C. for 5 minutes to obtain a heat seal layer having a thickness of 0.5 µm. In this way, a heat seal laminate Bh 3 having the phase difference layer, the three cholesteric liquid crystal layers (selective reflection layers), and the heat seal layer on the surface of the transparent support was obtained.

A coating solution 20 for forming a heat seal layer was applied to the cholesteric liquid crystal layer of the cholesteric liquid crystal layer laminate C using the wire bar, and then dried, heated at 120° C. for 5 minutes, placed on the hot plate at 75° C., and then irradiated with ultraviolet ray for 6 seconds using an electrodeless lamp "D bulb" (60 mW/cm$^2$) manufactured by Heraeus to obtain a heat seal layer having a thickness of 0.5 µm. In this way, a heat seal laminate Bh 4 having the phase difference layer, the three cholesteric liquid crystal layers (selective reflection layers), and the heat seal layer on the surface of the transparent support was obtained.

<Preparation of Laminated Glass>

A convex curved glass plate having a length of 260 mm×a width of 330 mm and a thickness of 2 mm, a PVB film (intermediate film) having a length of 260 mm×a width of 330 mm and a thickness of 0.38 mm manufactured by Sekisui Chemical Co., Ltd., and the heat seal laminates Bh 1 to 4 having a length of 220 mm×a width of 290 mm are used to prepare a laminated glass.

First, laminated glasses 2A and 2B were prepared.

The heat seal laminates Bh1 and 2 were disposed on the center of the curved glass plate (first glass plate) such that the heat seal layer side faces down, and an intermediate film was disposed thereon. The convex curved glass plate (second glass plate) having a length of 260 mm×a width of 330 mm and a thickness of 2 mm was disposed on the laminates.

The laminate was held at 90° C. and 10 kPa (0.1 atm) for 1 hour and heated in an autoclave (manufactured by Kurihara Seisakusho, K.K.) at 140° C. and 1.3 Mpa (13 atm) for 20 minutes to remove bubbles, and then laminated glasses 2A and 2B were obtained.

Both of laminated glasses 2A and 2B are formed by laminating the first glass plate, the heat seal layer, the transparent support, the phase difference layer, the selective reflection layer (cholesteric liquid crystal layer), the intermediate film, and the second glass plate in this order, and have the same layer constitution as the laminated glass shown in FIG. 2. However, the mixed layer was not formed in the laminated glass 2B (heat seal laminate Bh2).

Next, laminated glasses 2C and 2D were prepared.

The intermediate film is disposed on the center of the curved glass plate (first glass plate), and then the heat seal laminates Bh3 and 4 were disposed thereon such that the heat seal layer side faces up. Thereafter, the second glass plate was bonded similarly to the case of the laminated glass 2A, and the laminated glasses 2C and 2D were obtained.

Both of laminated glasses 2C and 2D are formed by laminating the first glass plate, the intermediate film, the transparent support, the phase difference layer, the selective reflection layer (cholesteric liquid crystal layer), the heat seal layer, and the second glass plate in this order, and have the same layer constitution as the laminated glass shown in FIG. 3.

The same evaluation was carried out on the prepared heat seal laminate and the prepared laminated glass.

In addition, in carrying out the adhesiveness evaluation of the heat seal laminate, the adhesiveness between the heat seal layer of the heat seal laminate and the transparent support was evaluated on Examples B1 and B2 (laminated glasses 2A and 2B), and the adhesiveness between the heat seal layer of the heat seal laminate and the selective reflection layer (cholesteric liquid crystal layer) was evaluated on Examples B3 and B4 (laminated glasses 2C and 2D).

TABLE 5

| | Laminated glass No. | Coating solution No. | Cholesteric liquid crystal No. | Laminate No. | Autoclave temperature [° C.] | Evaluation result of heat seal laminate | | | Evaluation result of laminated glass | | |
|---|---|---|---|---|---|---|---|---|---|---|---|
| | | | | | | Mixed layer Presence/Absence | Adhesiveness | Stickiness | Wrinkles | Projected image visibility | Haze |
| Example B1 | Laminated glass 2A | 8 | A | Heat seal laminate Bh 1 | 140 | Presence | A | A | B | A | A |
| Example B2 | Laminated glass 2B | 19 | A | Heat seal laminate Bh 2 | 140 | Absence | B | A | B | A | A |
| Example B3 | Laminated glass 2C | 19 | C | Heat seal laminate Bh 3 | 140 | Absence | B | A | A | A | A |
| Example B4 | Laminated glass 2D | 20 | C | Heat seal laminate Bh 4 | 140 | Absence | A | A | A | A | A |

The laminated glasses 2A to 2D could be subjected to the laminate processing without causing fine wrinkle unevenness in the laminate, and had excellent external light reflection and image visibility. In particular, since the laminated glasses 2C to 2D had excellent sticking properties with respect to the glass of the heat seal layer, handleability during the laminated glass processing was improved. Therefore, wrinkles were further decreased.

Furthermore, further excellent adhesiveness is obtained in the laminated glass 2D due to the adhesiveness enhancer.

<Preparation 2 of Heat Seal Layer>
(Coating Solution 2 for Forming Heat Seal Layer)
The following components were mixed to prepare the coating solutions 21 to 25 for forming a heat seal layer having composition shown in Table 6 below.

TABLE 6

| | Composition | Coating solution 21 | Coating solution 22 | Coating solution 23 | Coating solution 24 | Coating solution 25 |
|---|---|---|---|---|---|---|
| Heat seal resin | Piece of PVB sheet (manufactured by Sekisui Chemical Co., Ltd.) | 4.73 | 4.73 | 4.73 | — | — |
| | S LEC KS-10 (manufactured by Sekisui Chemical Co., Ltd.) | — | — | — | 4.75 | 4.73 |
| Inorganic particles | AEROSIL RX 300 (manufactured by Nippon Aerosil Co., Ltd.) | 4.97 | 4.98 | 4.97 | 5.00 | 4.98 |
| Adhesiveness enhancer | Adhesiveness enhancer 1 | 0.50 | — | — | — | — |
| | Adhesiveness enhancer 2 | — | 0.50 | — | — | 0.50 |
| | Adhesiveness enhancer 3 | — | — | 0.50 | — | — |
| Polymerization initiator | IRGACURE OXE 01 (manufactured by BASF Corporation) | 0.005 | — | 0.005 | — | — |
| Solvent | Methanol | 42.54 | 42.54 | 42.54 | 42.75 | 42.54 |
| | 1-Butanol | 2.36 | 2.36 | 2.36 | 2.38 | 2.36 |
| | Methylacetate | 44.90 | 44.90 | 44.90 | 45.13 | 44.90 |

Adhesiveness enhancer 1 (compound having a polymerizable group and a boronic acid group)

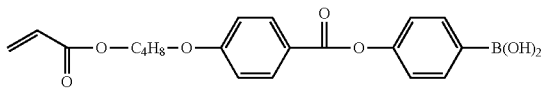

Adhesiveness enhancer 2 (Tosoh Corporation, Coronate L: Compound having three isocyanate groups in one molecule)

Adhesiveness enhancer 3 (Nippon Kayaku Co., Ltd., PET-30: Compound having three to four polymerizable groups in one molecule)

<Preparation 3 of Heat Seal Laminate>
The coating solutions 21 to 25 for forming a heat seal layer were applied to a rear surface of the cholesteric liquid crystal layer laminate A (the surface side not coated with cholesteric liquid crystal) using the wire bar, and then dried and heated at 50° C. for 1 minute to obtain heat seal layers having a thickness of 0.5 μm and 1.5 μm respectively. In this way, heat seal laminates Ch1 to 10 having the phase difference layer and three cholesteric liquid crystal layers (selective reflection layers) on one surface of the transparent support and the heat seal layer on the other surface of the transparent support were obtained.

The evaluations of the adhesiveness between the heat seal layers of the heat seal laminates Ch1 to 10 and the transparent support were all A.

<Preparation of Laminated Glass>
The heat seal laminates Ch1 to 10 having a length of 220 mm×a width of 290 mm were disposed on the center of an upwardly convex curved glass plate having a length of 260 mm×a width of 330 mm and a thickness of 2 mm such that the heat seal layer side faces down. Next, a PVB film (intermediate film) having a length of 260 mm×a width of 330 mm and a thickness of 0.38 mm manufactured by Sekisui Chemical Co., Ltd. is disposed on the selective reflection layer of the heat seal laminate. Thereby, a laminate is formed to have the first glass plate, the heat seal layer, the transparent support, the phase difference layer, the selective reflection layer (cholesteric liquid crystal layer), and the intermediate film in this order.

The convex curved glass plate (second glass plate) having a length of 260 mm×a width of 330 mm and a thickness of 2 mm was disposed on the laminates. The laminate was held at 90° C. and 10 kPa (0.1 atm) for 1 hour and heated in an autoclave (manufactured by Kurihara Seisakusho, K.K.) at 140° C. and 1.3 Mpa (13 atm) for 20 minutes to remove bubbles, and then laminated glasses 3A to 3J were obtained.

The same evaluation was carried out on the prepared laminated glass.

The laminated glasses 3A to 3J basically have the same layer constitution as the laminated glass shown in FIG. 2.

TABLE 7

| Laminated glass No. | Laminated glass No. | Coating solution No. | Cholesteric liquid crystal No. | Laminate No. | Thickness of heat seal layer [μm] | Mixed layer Presence/ Absence | Autoclave temperature [° C.] | Evaluation result of laminated glass | | |
|---|---|---|---|---|---|---|---|---|---|---|
| | | | | | | | | Wrinkles | Projected image visibility | Haze |
| Example C1 | Laminated glass 3A | 21 | A | Heat seal laminate Ch 1 | 0.5 | Presence | 140 | A | A | A |
| Example C2 | Laminated glass 3B | 21 | A | Heat seal laminate Ch 2 | 1.5 | Presence | 140 | A | A | A |
| Example C3 | Laminated glass 3C | 22 | A | Heat seal laminate Ch 3 | 0.5 | Presence | 140 | A | A | A |
| Example C4 | Laminated glass 3D | 22 | A | Heat seal laminate Ch 4 | 1.5 | Presence | 140 | A | A | A |
| Example C5 | Laminated glass 3E | 23 | A | Heat seal laminate Ch 5 | 0.5 | Presence | 140 | A | A | A |
| Example C6 | Laminated glass 3F | 23 | A | Heat seal laminate Ch 6 | 1.5 | Presence | 140 | A | A | A |
| Example C7 | Laminated glass 3G | 24 | A | Heat seal laminate Ch 7 | 0.5 | Presence | 140 | A | A | A |
| Example C8 | Laminated glass 3H | 24 | A | Heat seal laminate Ch 8 | 1.5 | Presence | 140 | A | A | A |
| Example C9 | Laminated glass 3I | 25 | A | Heat seal laminate Ch 9 | 0.5 | Presence | 140 | A | A | A |
| Example C10 | Laminated glass 3J | 25 | A | Heat seal laminate Ch 10 | 1.5 | Presence | 140 | A | A | A |

The laminated glasses 3A to 3J could be subjected to the laminate processing without causing fine wrinkle unevenness in the laminate, and had excellent external light reflection and image visibility.

<Preparation 3 of Heat Seal Layer>

(Preparation of Coating Solution for Forming Heat Seal Layer)

The following components were mixed to prepare the coating solutions 26 to 29 for forming a heat seal layer having composition shown in Table 8 below.

In preparation of the coating solution for forming the heat seal layer, the following materials were used.

S LEC KS-5 (manufactured by Sekisui Chemical Co., Ltd.)

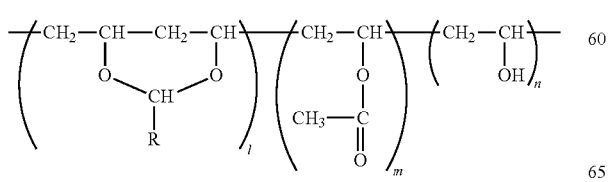

Here, l was 74±3, m was 3 or less, n was about 25, and the calculated molecular weight was about 130,000.

S LEC KS-10 (manufactured by Sekisui Chemical Co., Ltd.)

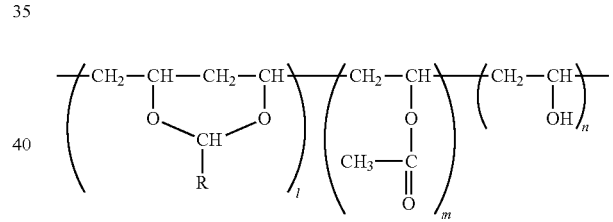

Here, l was 74-3, m was 3 or less, n was about 25, and the calculated molecular weight was about 17,000.

As a crosslinking agent (epoxy-based additive) for the resin of the heat seal layer, Denacol EX832 (manufactured by Nagase ChemteX Corporation) was used.

Cationic polymerization initiator 1

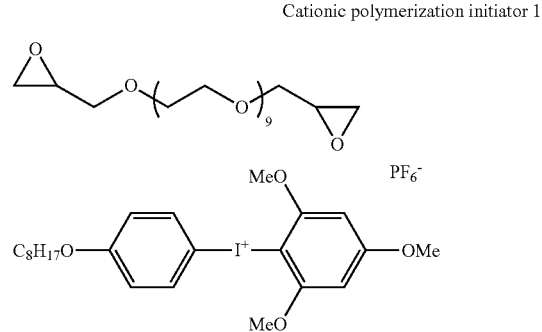

TABLE 8

| | Heat seat layer composition | Unit | Coating solution 26 | Coating solution 27 | Coating solution 28 | Coating solution 29 |
|---|---|---|---|---|---|---|
| Resin | S LEC KS-5 (manufactured by Sekisui Chemical Co., Ltd.) | Part by mass | 4.75 | 4.75 | — | — |
| | S LEC KS-10 (manufactured by Sekisui Chemical Co., Ltd.) | Part by mass | — | — | 4.75 | 4.19 |
| Inorganic particles | AEROSIL RX 300 (manufactured by Nippon Aerosil Co., Ltd.) | Part by mass | 5.00 | 5.00 | 5.00 | 4.41 |
| Crosslinking agent | Denacol EX832 (manufactured by Nagase ChemteX Corporation) | Part by mass | — | — | — | 0.42 |
| Polymerization initiator | Cationic polymerization initiator 1 | Part by mass | — | — | — | 0.17 |
| Solvent | Methanol | Part by mass | 42.87 | 42.87 | 42.87 | 43.13 |
| | 1-Butanol | Part by mass | 2.26 | 2.26 | 2.26 | 2.27 |
| | Methylacetate | Part by mass | 45.13 | — | — | 45.40 |
| | Cyclohexanone | Part by mass | — | 45.13 | 45.13 | — |

<Preparation of Heat Seal Laminates Dh1 to 4>

The coating solutions 26 to 29 for forming a heat seal layer were applied to a rear surface of the cholesteric liquid crystal layer laminate A (the surface side not coated with cholesteric liquid crystal) using the wire bar, and then dried and heated at 50° C. for 1 minute to obtain heat seal layers 26 to 29 having a thickness of 0.5 μm.

Furthermore, the heat seal layer 29 was irradiated with ultraviolet ray for 33 seconds using an electrodeless lamp "D bulb" (60 mW/cm$^2$) manufactured by Heraeus at the room temperature in a nitrogen atmosphere.

In this way, heat seal laminates Dh1 to 4 having the phase difference layer and three cholesteric liquid crystal layers (selective reflection layers) on one surface of the transparent support and the heat seal layers 26 to 29 on the other surface of the transparent support were obtained.

<Preparation of Laminated Glass>

The heat seal laminates Dh1 to 4 having a length of 220 mm×a width of 290 mm were disposed on the center of an upwardly convex curved glass plate having a length of 260 mm×a width of 330 mm and a thickness of 2 mm such that the heat seal layer side faces down. Thereby, a laminate is formed to have the first glass plate, the heat seal layer, the transparent support, the phase difference layer, and the selective reflection layer (cholesteric liquid crystal layer) in this order.

A PVB film (intermediate film) having a length of 260 mm×a width of 330 mm and a thickness of 0.38 mm manufactured by Sekisui Chemical Co., Ltd. is disposed on the selective reflection layer, and the upwardly convex curved glass plate (second glass plate) having a length of 260 mm×a width of 330 mm and a thickness of 2 mm was further disposed thereon. The laminate was held at 90° C. and 10 kPa (0.1 atm) for 1 hour and heated in an autoclave (manufactured by Kurihara Seisakusho, K.K.) at 140° C. and 1.3 Mpa (13 atm) for 20 minutes to remove bubbles, and then laminated glasses 4A to 4D were obtained.

The laminated glasses 4A to 4D have the same layer constitution as the laminated glass shown in FIG. 2.

The same evaluation was carried out on the prepared heat seal laminate and the prepared laminated glass. As a result, excellent results were obtained as shown in Table 9 below.

TABLE 9

| | | | Autoclave temperature [° C.] | Storage elastic modulus at autoclave temperature [GPa] | Re [nm] | Evaluation result | | | | |
|---|---|---|---|---|---|---|---|---|---|---|
| | | | | | | Heat seal laminate | | | Laminated glass | |
| | Laminated glass No. | Laminate No. | | | | Mixed layer Presence/Absence | Adhesiveness | Stickiness | Wrinkles | Projected image visibility | Haze |
| Example D1 | Laminated glass 4A | Heat seal laminate Dh 1 | 140 | 1.02 | 1 | Presence | A | A | A | A | A |
| Example D2 | Laminated glass 4B | Heat seal laminate Dh 2 | 140 | 1.02 | 1 | Presence | A | A | A | A | A |
| Example D3 | Laminated glass 4C | Heat seal laminate Dh 3 | 140 | 1.02 | 1 | Presence | A | A | A | A | A |
| Example D4 | Laminated glass 4D | Heat seal laminate Dh 4 | 100 | 2.44 | 1 | Presence | A | A | A | A | A |

EXPLANATION OF REFERENCES

1: transparent support
2: phase difference layer
3: selective reflection layer
4: heat seal layer
5: intermediate film
6: first glass
7: second glass
10: half-mirror film
100: projector (p-polarized image)

What is claimed is:

1. A half-mirror film for displaying a projection image comprising:
a transparent support; and
a selective reflection layer reflecting light in a wavelength selective manner, wherein the transparent support has an absolute value of 10 nm or less of an in-plane phase difference at a wavelength of 550 nm and a heat seal layer disposed on an opposite surface of a surface having the selective reflection layer, the heat seal layer contains a thermoplastic resin, a mixed layer in which a component of the transparent support and a component of the heat seal layer are mixed is formed between the transparent support and the heat seal layer, and a thickness of the heat seal layer is 0.1 to 5 µm.

2. The half-mirror film for displaying a projection image according to claim 1, further comprising:

a phase difference layer between the transparent support and the selective reflection layer, wherein an in-plane phase difference of the phase difference layer at a wavelength of 550 nm is 250 to 450 nm or 50 to 180 nm.

3. The half-mirror film for displaying a projection image according to claim 2, wherein an in-plane phase difference of the phase difference layer at a wavelength of 550 nm is 50 to 180 nm, and a slow axis of the phase difference layer is in a range of +120° to +175° or −120° to −175° with respect to an upper vertical direction.

4. The half-mirror film for displaying a projection image according to claim 1, wherein a surface of the heat seal layer is roughened.

5. The half-mirror film for displaying a projection image according to claim 1, wherein at least one of the transparent support or the heat seal layer contains a component derived from a compound having a plurality of groups selected from the group consisting of a polymerizable group and a group capable of forming a bond with a resin contained in the transparent support.

6. A laminated glass for displaying a projection image comprising:

the half-mirror film for displaying a projection image according to claim 1; and an intermediate film adjacent to the selective reflection layer of the half-mirror film for displaying a projection image, wherein the half-mirror film for displaying a projection image and the intermediate film are sandwiched by two glass plates.

7. An image display system comprising:

the laminated glass for displaying a projection image according to claim 5, wherein an image is projected from a p linearly polarized light source to the laminated glass for displaying a projection image.

8. The half-mirror film for displaying a projection image according to claim 1, wherein the heat seal layer is formed of a composition containing 30% to 70% by mass of at least one solvent having permeability into the transparent support with respect to a total amount of the solvent.

9. The half-mirror film for displaying a projection image according to claim 1, wherein the thickness of the heat seal layer is 0.1 to 3 µm.

10. A laminated glass for displaying a projection image comprising:

a half-mirror film;

an intermediate film;

a heat seal layer; and a transparent support adjacent to the half-mirror film, wherein the half-mirror film and the intermediate film are sandwiched by a glass plate on the half-mirror film side and a glass plate on the intermediate film side, the heat seal layer has a thermoplastic resin, is formed between the half-mirror film and the glass plate of the half-mirror film side, and has a thickness of 0.1 to 50 µm, the heat seal layer contains a component derived from a compound having a plurality of groups selected from the group consisting of a polymerizable group and a group capable of forming a bond with a resin contained in the transparent support, and all end portions of the half-mirror film and all end portions of the transparent support are located at least 15 mm inside from an end portion of the intermediate film.

11. The laminated glass for displaying a projection image according to claim 10, wherein the half-mirror film has a selective reflection layer that reflects light in a wavelength selective manner and a phase difference layer, and the heat seal layer is adjacent to the selective reflection layer or the phase difference layer.

12. The laminated glass for displaying a projection image according to claim 11, wherein the heat seal layer is adjacent to the selective reflection layer.

13. The laminated glass for displaying a projection image according to claim 10, wherein the heat seal layer contains an inorganic fine particle which forms a secondary particle formed by aggregation of primary particles in which an average primary particle diameter is 5 to 50 nm.

14. An image display system comprising:

the laminated glass for displaying a projection image according to claim 6, wherein an image is projected from a p linearly polarized light source to the laminated glass for displaying a projection image.

15. The laminated glass for displaying a projection image according to claim 10, wherein the heat seal layer contains an inorganic fine particle which forms a secondary particle in which an average secondary particle diameter is 100 to 500 nm formed by aggregation of primary particles in which an average primary particle diameter is 5 to 50 nm, and the heat seal layer contains the inorganic fine particle of 1% to 40% by mass with respect to the total solid content of the heat seal layer.

16. The laminated glass for displaying a projection image according to claim 10, wherein the thickness of the heat seal layer is 0.1 to 10 µm.

17. The laminated glass for displaying a projection image according to claim 10, wherein the thickness of the heat seal layer is 0.1 to 5 µm.

18. The laminated glass for displaying a projection image according to claim 10, wherein the thickness of the heat seal layer is 0.1 to 3 µm.

19. A laminated glass for displaying a projection image comprising:

a half-mirror film;

an intermediate film; and a heat seal layer;

wherein the half-mirror film and the intermediate film are sandwiched by a glass plate on the half-mirror film side and a glass plate on the intermediate film side, the heat seal layer has a thermoplastic resin, is formed between the half-mirror film and the glass plate on the half-mirror film side, and has a thickness of 0.1 to 50 µm, the half-mirror film has a selective reflection layer that reflects light in a wavelength selective manner and a phase difference layer, an in-plane phase difference of the phase difference layer at a wavelength of 550 nm is 50 to 180 nm, a thickness of the heat seal layer is 0.1 to 5 μm, and a slow axis of the phase difference layer is in a range of +120° to +175° or −120° to −175° with respect to an upper vertical direction of the laminated glass.

20. The laminated glass for displaying a projection image according to claim 19, wherein the thickness of the heat seal layer is 0.1 to 3 μm.

* * * * *